US006298476B1

(12) United States Patent
Misheski et al.

(10) Patent No.: US 6,298,476 B1
(45) Date of Patent: Oct. 2, 2001

(54) OBJECT ORIENTED SOFTWARE BUILD FRAMEWORK MECHANISM

(75) Inventors: David Joseph Misheski, Plainview; Clifton Malcolm Nock, Rochester, both of MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 08/566,465

(22) Filed: Dec. 4, 1995

(51) Int. Cl.[7] .................................................. G06F 9/45

(52) U.S. Cl. ........................... 717/5; 717/2; 717/3

(58) Field of Search ................................. 395/705, 703, 395/701, 712, 683; 717/5, 3, 2, 1; 709/315, 310

(56) References Cited

U.S. PATENT DOCUMENTS

| 4,558,413 | * 12/1985 | Schmidt et al. | 364/300 |
| 4,943,932 | 7/1990 | Lark et al. | 364/513 |
| 5,057,996 | 10/1991 | Cuter et al. | 364/200 |

(List continued on next page.)

OTHER PUBLICATIONS

Text of *IBM Technical Disclosure Bulletin*, vol. 37, DeBinder et al., Feb. 1994, "Results Folder Framework", pp. 431–432.
Text of *IBM Technical Disclosure Bulletin*, vol. 36, Coskun, N., Jun. 1993, "Persistent Framework Independent Record/Playback Framework", pp. 261–264.
Text of *IBM Technical Disclosure Bulletin*, Baker et al., Oct. 1991, "Model View Schema", pp. 321–322.
Text of *IBM Technical Disclosure Bulletin*, Baker et al., Oct. 1991, "Office Container Class", pp. 309–310.
Text of *IBM Technical Disclosure Bulletin*, Cavendish et al., Jul 1991, "Icon Pane Class", pp. 118–119.
Text of *IBM Technical Disclosure Bulletin*, Baker et al., Jun. 1991, "Distribution List Class", p. 159.
Text of *IBM Technical Disclosure Bulletin*, Cavendish et al., Jun. 1991, "Object–Oriented Documentation Tool", pp. 50–51.
Text of *IBM Technical Disclosure Bulletin*, Allard et al., Feb. 1990, "Object–Oriented Programming in C—the Linnaeus System", pp. 437–439.
Text of *IBM Technical Disclosure Bulletin*, vol. 38, No. 1, Jan. 1995, pp. 411–414, J. Knapman "Generating Specific Server Programs in Distributed Object–Oriented Customer Information Control System".

(List continued on next page.)

*Primary Examiner*—Majid Banankhah
*Assistant Examiner*—Sue Lao
(74) *Attorney, Agent, or Firm*—Martin & Associates, L.L.C.; Derek P. Martin

(57) ABSTRACT

A framework for use with object-oriented programming systems provides a software build system that detects modules that make up a software product, examines each module to determine if it is up-to-date, and automatically updates any modules that require processing. The framework includes a software object of a class called "Product" that comprises a software product to be processed and built. An instance of the Product is comprised of multiple software build objects, each of which is called "Object". Each Object in turn contains four objects that are a kind of object class called BldSrc (Build Source). The BldSrc objects specify a different aspect of the software product and desired processing. Each of the software build objects in a Product's Object list is examined to determine if all four of the BldSrc objects is current. If any one of the software build objects is not current, the Object is re-built. If all four objects are current, the re-building step is skipped. In this way, each of the software build Objects making up a Product is automatically examined and processed, and the Product is produced.

30 Claims, 20 Drawing Sheets

U.S. PATENT DOCUMENTS

| | | | |
|---|---|---|---|
| 5,101,364 | | 3/1992 | Davenport et al. ................. 395/152 |
| 5,119,475 | | 6/1992 | Smith et al. ......................... 395/156 |
| 5,181,162 | | 1/1993 | Smith et al. ......................... 364/419 |
| 5,182,807 | * | 1/1993 | Mizuse et al. ...................... 395/700 |
| 5,195,172 | | 3/1993 | Elad et al. ............................ 395/50 |
| 5,226,161 | | 7/1993 | Khoyi et al. ......................... 395/650 |
| 5,247,693 | | 9/1993 | Bristol ................................. 395/800 |
| 5,249,270 | | 9/1993 | Stewart et al. ....................... 395/200 |
| 5,257,384 | | 10/1993 | Farrand et al. ...................... 395/725 |
| 5,261,080 | | 11/1993 | Khoyi et al. ......................... 395/500 |
| 5,274,572 | | 12/1993 | O'Neill et al. ....................... 364/550 |
| 5,276,775 | | 1/1994 | Meng .................................... 395/55 |
| 5,287,447 | | 2/1994 | Miller et al. ......................... 395/157 |
| 5,293,470 | | 3/1994 | Birch et al. .......................... 395/135 |
| 5,297,283 | | 3/1994 | Kelly, Jr. et al. .................... 395/650 |
| 5,315,703 | | 5/1994 | Matheny et al. ..................... 395/164 |
| 5,325,533 | * | 6/1994 | McInerney et al. ................. 395/700 |
| 5,367,633 | | 11/1994 | Matheny et al. ..................... 395/164 |
| 5,369,766 | | 11/1994 | Nakano et al. ...................... 395/700 |
| 5,379,430 | * | 1/1995 | Nguyen ................................ 395/700 |
| 5,388,264 | | 2/1995 | Tobias, II et al. ................... 395/650 |
| 5,390,325 | | 2/1995 | Miller .................................. 395/575 |
| 5,396,626 | | 3/1995 | Nguyen ................................ 395/700 |
| 5,398,336 | | 3/1995 | Tantry et al. ......................... 395/600 |
| 5,421,009 | * | 5/1995 | Platt ..................................... 395/600 |
| 5,493,682 | * | 2/1996 | Tyra et al. ............................ 395/700 |
| 5,579,509 | * | 11/1996 | Furtney et al. ....................... 395/500 |
| 5,956,479 | * | 9/1999 | McInerney et al. ............ 395/183.14 |

OTHER PUBLICATIONS

Text of *IBM Technical Disclosure Bulletin,* vol. 37, No. 12, Dec. 1994, pp. 19–20, AlKarmi et al., "Events Set for Event Tracing in Distributed Object–Oriented Systems".

Text of *IBM Technical Disclosure Bulletin,* vol. 37, No. 12, Dec. 1994, pp. 375–378, Acker et al., "Automatically Generating Formatted Documentation for Object–Oriented Class Libraries".

Text of *IBM Technical Disclosure Bulletin,* vol. 37, No. 11, Nov. 1994, pp. 71–72, Behrs et al., "Device Support Framework to Support ISO DPA 10175 and POSIX 1387.4".

Text of *IBM Technical Disclosure Bulletin,* vol. 37, No. 7, Jul. 1994, pp. 145–146, Banda et al., "Exception Management Algorithm for Multi–Threaded Method Invocation".

Text of *IBM Technical Disclosure Bulletin,* vol. 37, No. 6B, Jun. 1994, pp. 553–556, Gest et al., "Portable Object–Oriented Event Manager".

Abstract for WIPO Patent Application No. WO 95/04966, F.T. Nguyen, Feb. 16, 1995, "Automatic Management of Components in Object–Oriented System".

Abstract for U.S. Patent No. 5,388,264, Milne et al., Feb. 7, 1995, "Object–Oriented Framework System for Enabling Multimedia Presentations with Routing and Editing of MIDI Information".

Abstract for WIPO Patent Application No. WO 94/23364, Heninger et al., Oct. 13, 1994, "Framework Processing Apparatus for Application Software".

Abstract for U.S. Patent No. 5,369,766, Heninger et al., Nov. 29, 1994, "Object Oriented Application Processing Apparatus".

Abstract from WIPO Patent Application No. WO 9422081, Sep. 29, 1994, "Hardware–Independent Interface for Interrupt Processing", G.O. Norman et al.

Abstract for WIPO Patent Application No. 94/19752, Anderson et al., Sep. 1, 1994, "Concurrent Framework Processing Apparatus For Two or More Users".

Abstract for WIPO Patent Application No. 94/19751, Anderson et al., Sep. 1, 1994, "Concurrent Framework Processing Apparatus For Application Users".

Abstract for WIPO Patent Application No. 94/19740, Goldsmith et al., Sep. 1, 1994 "Framework Processor of Object–Oriented Application".

Abstract for WIPO Patent Application No. 94/15286, Goldsmith et al., Jul. 7, 1994, "Object–Oriented Framework for Object Operating System".

Abstract for WIPO Patent Application No. 94/15282, Anderson et al., Jul. 7, 1994, "Dialog System Object–Oriented System Software Platform".

Abstract for WIPO Patent Application No. 94/15281, Anderson et al., Jul. 7, 1994, "Atomic Command Object–Oriented System Software Platform".

Abstract from WIPO Patent Application No. WO 9415285, Jul. 7, 1994, "Object–Oriented Notification Framework System", D.R. Anderson et al.

Abstract for U.S. Patent No. 5,119,475, Schoen et al., Jun. 2, 1992, "Object–Oriented Framework for Menu Definition".

Abstract No. 95–091003/12, "Flexible Multi–Platform Partitioning for Computer Applications in Object Oriented System".

Abstract for WIPO Patent Application No. 95/01610, Koko et al., Jan. 12, 1995, "Object Oriented Product Structure Management in Computer–Aided Product Design".

Abstract for WIPO Patent Application No. 95/04967, Feb. 16, 1995, "Access Method to Data Held in Primary Memory Based Data Base".

Abstract for WIPO Patent Application No. 95/02210, Helgeson et al., Jan. 19, 1995, "Distributed Computation Based on Movement, Execution and Insertion of Processes in Network".

Abstract from U.S. Patent No. 5,371,891, "Object Constructions in Compiler in Object Oriented Programming Language", J. Gray et al., Dec. 6, 1994.

Abstract from EPO Patent Application No. EP 622730, "Encapsulation of Extracted Portions of Documents Into Objects", M.A. Malamud, Nov. 2, 1994.

Abstract for EPO Patent No. 619544, S. Danforth, Oct. 12, 1994, "Language–Neutral Object–Oriented Programming".

Abstract for WIPO Patent No. 94/20912, Sep. 15, 1994, "Object–Oriented System for Managing Financial Instruments".

Inspec Abstract No. C9504–7460–043, Sells et al., 1995, "Implementation of the Architecture for a Time–Domain Dynamical System Simulation in a Very High–Level Pictorial Object–Oriented".

Inspec Abstract No. C9504–7460–042, Coleman et al., 1995, "An End–To–End Simulation of A Surveillance System Employing Architecture Independence, Variable Fidelity Components and Software Reuse".

Inspec Abstract No. C9503–6140D–045, Satoh et al., 1995, "Process Algebra Semantics for a Real Time Object Oriented Programming Language".

Inspec Abstract No. C9501–7160–020, C. Le Pape, 1993, "The Cost of Genericity: Experiments With Constraint–Based Representations of Time–Tables".

Inspec Abstract No. C9501–6140D005, S. Vinoski, 1994, "Mapping CORBA IDL Into C++".

Inspec Abstract No. C9501–7330–007, Salminen et al., 1994, "Modeling Trees Using an Object–Oriented Scheme".

Inspec Abstract No. C9412–6110B–221, Berghel et al., 1992, "A Generic Object–Oriented Concurrency Mechanism for Extensibility and Reuse of Synchronization Components".

Inspec Abstract No. B9412–6210Q–016, from Qingzhong et al., 1992, "An Object–Oriented Model for Intelligent Networks".

Inspec Abstract No. C9412–7810–003, from Jung et al., 1993, "Development of an Object–Oriented Anthropometric Database for an Ergonomic Man Model".

Inspec Abstract No. C9412–6110J–014 from Griss et al., 1994, "Object–Oriented Reuse".

Inspec Abstract No. C9411–6130B–108, from Mili et al., 1992, "Building a Graphical Interface for a Reuse–Oriented Case Tool".

Inspec Abstract No. C9411–7100–029 from C. Le Pape, 1994, "Implementation of Resource Constraints in ILOG Schedule: A Library for the Development of Constraint-–Based Scheduling Systems".

Inspec Abstract No. C9411–6115–035 from Mili et al., 1991, "SoftClass: An Object–Oriented Tool for Software–Reuse".

Inspec Abstract No. C9410–6180G–015, from Eichelberg et al., 1993, "Integrating Interactive 3D–Graphics into an Object–Oriented Application Framework".

Inspec Abstract No. B9409–6210M–025, from Hellemans et al., 1994, "An Object–Oriented Approach to Dynamic Service Descriptions".

Inspec Abstract No. C9409–6180–059, from Wang et al., 1993, "A Framework for User Customization".

Inspec Abstract No. C9408–6110B–016, from Chen et al., 1994, "An Experimental Study of Using Reusable Software Design Frameworks to Achieve Software Reuse".

Inspec Abstract No. C9408–7420–021, from Pirklbauer et al., 1994, "Object–Oriented Process Control Software".

Inspec Abstract No. C9408–6110J–011 from Gyu–Chung et al., 1993, "System Methodologies of Object–Oriented Programs".

Inspec Abstract No. C9407–7420D–045, from Desai et al., 1994, "Controller Structure Definition Via Intelligent Process Control".

Inspec Abstract No. C9407–6140D–014, from Satoh et al., 1994, "Semantics for a Real–Time Object–Oriented Programming Language".

Inspec Abstract No. C9406–6150N–015, from Schmidt et al., 1994, "The Service Configurator Framwork: An Extensible Architecture for Dynamically Configuring Concurrent, Multi–Service Network Daemons".

Inspec Abstract No. C9405–6180G–031, from Woyak et al., 1993, "A Motif–Like Object–Oriented Interface Framework Using PHIGS".

Inspec Abstract No. C9403–6180–027, 1991, "An Event–Object Recovery Model for Object–Oriented User Interfaces-"from Proceedings of ACMSymposium on User Interface Software & Technology.

Inspec Abstract No. C9504–6130B–049, from A. van Dam, 1995, "VR as a Forcing Function: Software Implications of a New Paradigm".

Inspec Abstract No. C9504–6140D–024, from Sheffler et al., 1995, "An Object–Oriented Approach to Nested Data Parallelism".

Inspec Abstract No. C9503–6110B–045, from Rosiene et al., 1995, "A Data Modeling Framework for Queueing Network Models".

Inspec Abstract No. B9503–8110B–023, from Mautref et al., 1995, "An Object–Oriented Framework for the Development of Interactive Decision Support Systems".

Inspec Abstract No. C9502–7160–026, from Menga et al., 1995, "An Object–Oriented Framework for Enterprise Modeling".

Inspec Abstract No. C9502–6130G–006, "Support for Enterprise Modelling in CSCW", P. Hennessy et al., 1994.

Inspec Abstract No. C9502–7810C–058, from Lin et al., 1995, "Can CAL Software Be More Like Computer Games?".

Inspec Abstract No. C9501–6115–039, from Elia et al., 1993, "G++: An Object Oriented Environment for Developing Distributd Applications".

Inspec Abstract No. C9412–7330–186 from Righter et al., 1994, "An Object–Oriented Characterization of Spatial Ecosystem Information".

Inspec Abstract No. C9412–6160J–025 from J. livari, 1994, "Object–Oriented Information Systems Analysis: A Comparison of Six Object–Oriented Analysis Methods".

Inspec Abstract No. C9412–6110J–006, from Lau et al., 1993, "Using SOM for Tool Integration".

Inspec Abstract No. C9411–6160J–011, from Odberg et al., 1992, "A Framework for Managing Schema Versioning in Object–Oriented Databases".

Inspec Abstract No. C9406–7490–012, "A Discrete–Event Object–Oriented Modeling Environment for Sawmill Simulation".

Inspec Abstract No. C9406–6115–048, 1993, "Constructing Multi–View Editing Environments Using MViews".

Inspec Abstract No. 4664213, "Maintaining Information about Persistent Replicated Objects in a Distrubuted System"., 1993 IEEE Conference on Distributed Computing Systems.

Inspec Abstract No. C9406–6110J–029, "A Comparison of Object–Oriented Analysis and Design Methods", Proceedings of C++ World 1993.

Inspec Abstract No. C9406–0310F–011, 1993, "Cost–Benefit Analysis of Object–Oriented Technology".

Inspec Abstract No. C9406–6110J–009, from, J.D. Grimes, 1993, "Objects 101–An Implementation View", Proceedings of C++World 1993.

Inspec Abstract No. 4647921, from Uhorchak et al., 1993, "An Object–Oriented Class Library for Creating Engineering Graphs Using PHIGS".

Inspec Abstract No. 46422214, from, Marshall et al., 1992, "Using VDM Within an Object–Oriented Framework".

Inspec Abstract No. 4626386, from Arora et al., 1993, "Building Diverse Environments with PCTE Workbench".

Inspec Abstract No. 4622794, from Campbell et al., 1993, "A Technique for Documenting the Framework of an Object–Oriented System".

Inspec Abstract No. 4618974, from Bowers, 1993, "Some Principles for the Encapsulation of the Behaviour of Aggregate Objects".

Inspec Abstract No. 461931, from, Islan et al., 1993, "Uniform Co–Scheduling Using Object–Oriented Design Techniques".

Inspec Abstract No. 4613481, from Thieme et al., 1993, "Schema Integration in Object–Oriented Databases".

Inspec Abstract No. 4603430, from G. Booch, 1994, "Designing an Application Framework".

Inspec Abstract No. 4596323, from Frank et al., 1993, "An Integrated Environment for Designing Object–Oriented Enterprise Models".

Inspec Abstract No. 4593721, Periyasamy et al, 1993, "A Formal Framework for Design and Verification of Robotic Agents".

Inspec Abstract No. 4588839, from L. Fisher, 1992, "Constructing a Class Library for Microsoft Windows".

Inspec Abstract No. 4588834, from G. Olander, 1992, "Chembench: Redesign of a Large Commercial Application Using Object–Oriented Techniques".

Inspec Abstract No. 4566447, from J. Rossazza, 1992, "An Object–Centered Fuzzy Representation".

Inspec Abstract No. 4565630, from Karpovich et al., 1993, "A Parallel Object–Oriented Framework for Stencil Algorithms".

Inspec Abstract No. C9402–6150G–002, from Bruegge et al., 1993, "A Framework for Dynamic Program Analyzers".

Inspec Abstract No. 4550414, from Parrish et al., 1993, "Automated Flow Graph–Based Testing of Object–Oriented Software Modules".

Inspec Abstract No. 4540729, from Bailes et al., "The ecology of Class Refinement".

Inspec Abstract No. 4534334, from Campbell et al., 1991, "A Technique for Documenting the Framework of an Object–Oriented System".

Inspec Abstract No. 4534330, from Istavrinos et al., 1992, "Experiences with an Object–Oriented Mapper for Coherent Distributed Shared Memory".

Inspec Abstract No. 4528985, from Beneventano et al., 1993, "Taxonomic Reasoning with Cycles in LOGIDATA+".

Inspec Abstract No. 4525743, from Hakimzadeh et al., 1993, "Instance Variable Access Locking for Object–Oriented Databases".

Inspec Abstract No. 4512593, from H. Sakai, 1993, "A Method for Contract Design and Delegation in Object Behavior Modeling".

Inspec Abstract No. B9310–6210L–099, "Templates, Types and Classes in Open Distrubuted Processing", 1993.

Inspec Abstract No. 4459325, from Kesim et al., 1992, "On the Evolution of Objects in a Logic Programming Framework".

Inspec Abstract No. 4447153, from Klein et al., 1992, "An Object–Oriented Framework for Curves and Surfaces".

Inspec Abstract No. 4426852, from Benveniste et al., 1992, "Concurrent Programming Notations in the Object–Oriented Language Arche".

Inspec Abstract No. 4425343, from Demurjian et al., 1993, "Programming Versus Databases in Object–Oriented Paradigm".

Inspec Abstract No. 4417604, from Kraiem et al., 1992, "Mapping of Conceptual Specifications Into Object–Oriented Programs".

Inspec Abstract No. 4417563, from E. Maim, 1992, "Recognizing Objects from Constraints".

Inspec Abstract No. 4411998, from Yi Deng et al., 1992, "Unifying Multi–Paradigms in Software System Design".

Inspec Abstract No. 4408394, from Allen et al., 1992, "GEM: Global Event Management in CAD Frameworks".

Inspec Abstract No. 4400350, from Y. Shoham, 1993, "Agent–Oriented Programming".

Inspec Abstract No. 4395549, from Hogstrom et al., 1992, "Portability and Data Structures in Scientific Computing–Object–Oriented Design of Utility Routines in Fortran".

Inspec Abstract No. 4391388, from Thomas et al., 1992, "A Generic Object–Oriented Concurrency Mechanism for Extensibility and Reuse of Synchronization Components".

Inspec Abstract No. 4387201, from Chu et al., 1992, "A Pattern Based Approach of Integrating Data and Knowledge to Support Cooperative Query Answering".

Inspec Abstract No. 4366189, from Holt, et al., 1992, "A Framework for Using Formal Methods in Object–Oriented Software Development".

Inspec Abstract No. 4356300, from Bertino et al., 1993, "Path–Index: An Approach to the Efficient Execution of Object–Oriented Queries".

Inspec Abstract No. 4341376, from Bertino et al., 1992, "Optimization of Object–Oriented Queries Using Path Indices".

Inspec Abstract No. 4331060, from Lau et al., 1992, "An Object–Oriented Class Library for Scalable Parallel Heuristic Search".

Inspec Abstract No. 4318465, from P. Madany, 1992, "Object–Oriented Framework for File Systems".

Inspec Abstract No. 4302722, from Eggenschwiler et al., 1992, "ET++SwapsManager: Using Object Technology in the Financial Engineering Domain".

Inspec Abstract No. 4298324, from S. Nichol, 1992, "Extending Turbo Vision".

Inspec Abstract No. 4297404, from Tanaka et al., 1992, "Two–Level Schemata and Generalized Links for Hypertext Database Models".

Inspec Abstract No. 4287814, from Natarajan et al., 1992, "Issues in Building Dynamic Real–Time Systems".

Inspec Abstract No. 4281362, from Marshall et al., 1991, "Using VDM within an Object–Oriented Framework".

Inspec Abstract No. 4275707, from Tsukamoto et al., 1991, "Dot: A Term Representation Using Dot Algebra for Knowledge–Bases".

Inspec Abstract No. 4275698, from Van den Bussche et al., 1991, "Evaluation and Optimization of Complex Object Selections".

Inspec Abstract No. 4275693, from Giannotti et al., 1991, "Non–Determinism in Deductive Databases".

Inspec Abstract No. 4270361, from Artale et al., 1991, "Introducing Knowledge Representation Techniques in Database Models".

Inspec Abstract No. 4077440, from A. Mahler, 1991, "Organizing Tools in a Uniform Environment Framework".

Inspec Abstract No. 4067033, from Shaw et al., 1990, "Experience with the ET++ Application Framework".

Inspec Abstract No. 4060084, from Muller et al., 1990, "ODICE: Object–Oriented Hardware Description in CAD environment".

Inspec Abstract No. 4050569, from Di Giovanni et al., 1990, "Hood Nets".

Inspec Abstract No. C91072815, from Holtkamp et al., 1990, "DEMOM–A Description Based Media Object Data Model".

Inspec Abstract No. C91072016, from A. Lane, 1991, "/DOS/C++–Application Frameworks".

Inspec Abstract No. C91072574, from Hemery et al., "An Analysis of Communication and Multiprogramming in the Helios Operating System".

Inspec Abstract No. C91064787, from Madany et al., 1989, "A Class Hierarchy for Building Stream–Oriented File Systems".

Inspec Abstract No. C91064580, from Gamma et al., 1989, "Integration of a Programming Environment Into ET++–A Case Study".

Inspec Abstract No. C91058815, from Menga et al., 1990 "G++: An Environment for Object Oriented Analysis and Prototyping".

Inspec Abstract No. B91051096, from Cusack et al., 1990, "Object–Oriented Specification in LOTOS and Z, or My Cat Really is Object–Oriented!".

Inspec Abstract No. C91053475, from Queinnec et al., 1988, "An Open Ended Data Representation Model for EU–LISP".

Inspec Abstract No. C91053151, from E. Cusack, 1991, "Refinement, Conformance and Inheritance".

Inspec Abstract No. C91042802, from T. Yokoyama, 1990, "An Object–Oriented and Constraint–Based Knowledge Representation System for Design Object Modeling".

Inspec Abstract No. C91041980, from Choi et al., 1991, "Graph Interpretation of Methods: A Unifying Framework for Polymorphism in Object–Oriented Programming".

Inspec Abstract No. C91042655, from Q. Li, 1991, "Extending Semantic Object Model: Towards More Unified View of Information Objects".

Inspec Abstract No. C91024852, from Pierra et al., 1990, "An Object Oriented Approach to Ensure Portability of CAD Standard Parts Libraries".

Inspec Abstract No. C91010951, from T. Helton, 1990, "Level5 Object".

Inspec Abstract No. B90075006, from Gossain et al., 1989, "Designing a Class Hierarchy for Domain Representation and Reusability".

Inspec Abstract No. C91003997, from J. Muys–Vasovic, 1989, "MacApp: An Object–Oriented Application Framework".

Inspec Abstract No. C91004708, from Bertino et al., 1990, "Optimization of Queries Using Nested Indices".

Inspec Abstract No. C90052277, from I. Tervonen, 1990, "Object–Oriented Development as a Multiview Software Construction Methodology".

Inspec Abstract No. C90052627, from Schrefl et al., 1988, "A Knowledge–Based Approach to Overcome Structural Differences in Object Oriented Database Integration".

Inspec Abstract No. C90047457, from Yokoyama et al., 1990, "A Constraint–Based and Object–Oriented Knowledge Representation".

Inspec Abstract No. C90034818, from Q. Chen, 1988, "Extending the Object–Oriented Paradigm for Supporting Complex Objects".

Inspec Abstract No. C90030609, from Forde et al., 1990, "Object–Oriented Finite Element Analysis".

Inspec Abstract No. C9000773, from Weinand et al., 1989, "Design and Implementation of ET++, A Seamless Object–Oriented Application Framework".

Inspec Abstract No. C89062837, from Pasquier–Boltuck et al., 1988, "Prototyping an Interactive Electronic Book System Using an Object–Oriented Approach".

Inspec Abstract No. C89056727, from Campbell et al., 1989, "Principles of Object–Oriented Operating System Design".

Inspec Abstract No. C89056859, from Hull et al., 1989, "On Accessing Object–Oriented Databases: Expressive Power, Complexity, and Restrictions".

Inspec Abstract No. C89049257, from Madany et al., 1989, "Class Hierarchy for Building Stream–Oriented File Systems".

Inspec Abstract No. C89039001, from Brophy et al., 1989, "A Framework for Multiple, Concurrent Graphical Representation".

Inspec Abstract No. C89033226, from Corradi et al., 1988, "PO: An Object Model to Express Parallelism".

Inspec Abstract No. C89014870, from R. King, 1988, "Semantic and Object–Oriented Database Support for Software Environments".

Inspec Abstract No. 89003142, from Tenma et al., 1986, "A System for Generating Language–Oriented Editors".

Inspec Abstract No. C88013915, from Woelk et al., 1987, "Multimedia Information Management in an Object–Oriented Database System".

Inspec Abstract No. C88007447, from P. Allen, 1987, "A Framework for Implementing Multisensor Robotic Tasks".

Inspec Abstract No. C87007043, from Whitted et al., 1986, "Exploiting Classes in Modeling and Display Software".

Inspec Abstract No. C86039588, from K. Fukunaga,, 1985, "Prompter: A Knowledge Based Support Tool for Code Understanding".

Inspec Abstract No. C86024804, from Greenspan et al., 1986, "A Requirements Modeling Language and Its Logic".

Inspec Abstract No. C84005713, from Meyer et al., 1983, "Towards a Two–Dimensional Programming Environment".

Inspec Abstract No. C81005505, from Mylopoulos et al., 1980, "Some Features of the TAXIS Data Model".

Inspec Abstract No. 4270125, from Becker et al., 1991, "Reusable Object–Oriented Specifications for Decision Support Systems".

Inspec Abstract No. 4258492, from M. Ball, 1992, "Inside Templates: Implementing C++ Strategies".

Inspec Abstract No. 4258051, from Rundensteiner et al., 1992, "Set Operations in Object–Based Data Models".

Inspec Abstract No. 424403, from George et al., 1991, "An Object–Oriented Data Model to Represent Uncertainty in Coupled Artificial Intelligence–Database Systems".

Inspec Abstract No. 4234438, from Madany et al., 1991, "Organizing and Typing Persistent Objects Within an Object–Oriented Framework".

Inspec Abstract No. 4152687, from M. Wolczko, 1992, "Encapsulation, Delegation and Inheritance in Object–Oriented Languages".

Inspec Abstract No. 4117514, from Wuwongse et al., 1991, "An Object–Oriented Approach to Model Managment".

Inspec Abstract No. C94204–6110J–017, "Choices Frameworks and Refinement", R.H. Campbell et al., 1991.

Inspec Abstract No. 4090970, from P. Kougiouris, 1991, "Device Management Framework for an Object–Oriented Operating System".

* cited by examiner

OBJECT ORIENTED SOFTWARE BUILD FRAMEWORK MECHANISM

BACKGROUND OF THE INVENTION

1. Field of the Invention

The present invention relates generally to data processing systems and, more specifically, to object-oriented programming systems and processes.

2. Description of the Related Art

Software development requires writing source code comprising lines of computer programming written in a suitable programming language and assembling executable code generated from the source code into a software product that can be loaded into computer memory and executed. The step of assembling executable code is referred to as a software build process. As part of the software build process, source input comprising source code and control information is processed by a compiler or similar utility control program. The compiled or otherwise processed code comprises executable control program output data. The executable output data can then be loaded onto a system and accessed by system users so the underlying application can be used.

There are many situations for which it might be necessary to develop a new software product that must be built. Development of a new computer hardware system, for example, might require development of new software to run on it. The new software must be written and built. Modern software products can comprise thousands of programming sub-parts or modules and any one of those modules might be changed. For example, new features might be added to existing software products by adding a new module or changing an existing module. If any one of the constituent source parts of a software product is changed, then the entire software product likely will have to be rebuilt.

Many of the processing steps involved in the software build process are similar across different system platforms or installations. The primary steps involved in a software build include assembling all the modules that make up a software product, checking each module to determine if the module is out-of-date or for any other reason must be re-built, compiling or otherwise processing each of the modules that must be re-built, and assembling all the built and re-built modules into a complete, executable software product.

There presently is no structured build processor that is sufficiently flexible and adaptable to permit re-use across different system installations and platforms. For example, a software product that is built for use with a computer system from the International Business Machines Corporation (IBM Corporation) computer processor product called "AS/400" might have to be re-built for each different system configuration. Such building potentially involves a system administrator processing each one of several hundred software modules to assemble the executable code making up the software product. Similarly, if a new hardware system is developed, it might be necessary to re-build a software product on the new hardware, even if previously existing source code can be used. This wastes resources. It would be advantageous if a software build processor could carry out the software build process for multiple versions of a software product, automatically detecting the portions of the software product that require building and then building only those portions. In this way, the amount of processing necessary for carrying out a software build would be reduced.

From the discussion above, it should be apparent that there is a need for a software build system that provides more automatic building of software products and re-use of built software. The present invention satisfies this need.

SUMMARY OF THE INVENTION

In accordance with the present invention, a reusable object oriented (OO) framework for use with object oriented programming computer systems comprises a software build system that responds to a user request for a software build process by detecting modules that make up a software product, examining each module to determine if it is up-to-date, and automatically updating any modules that require processing. The OO framework can be reused and extended to implement a wide variety of different software build systems. The framework defines some object relationships as core relationships, which cannot be changed, and defines other object relationships as extensible relationships, which can be specified by the framework user. Software build systems can be customized using the framework so they can accommodate a wide variety of operating systems, processing requirements, and conditions. In this way, the core structure of the framework serves as a basis for developing a software build system.

The framework includes a software object of a class called "Product" that comprises a software product to be processed and built. An instance of the Product is comprised of multiple software build objects called "Object". Each Object in turn contains a list of source objects that are a kind of object class called BldSrc (Build Source). The BldSrc objects specify a different aspect of the software product and specify desired object processing. Each of the software build objects in a Product's Object list is examined to determine if all of the is BldSrc objects is current. If any one of the software build objects is not current, the Object is re-built. If all the BldSrc objects are current, the re-building step is skipped. Each of the software build Objects making up a Product is automatically examined and processed. Thus, the framework provides a reusable software build system that automatically and efficiently builds software products.

In one aspect of the invention, each software build Object in a Product includes a core framework operation called process( ) that receives as input the BldSrc build source objects and implements processing to build the associated software build Object. For example, a process( ) operation for a FORTRAN-language Object would comprise a FORTRAN compiler, a process( ) operation for a Pascal-language Object would comprise a Pascal compiler, and so forth. The process( ) operation is a core operation in that the input parameters to the operation and the output produced are fixed types of objects. Each Object also includes operations to update attributes that keep track of whether any of the BldSrc objects in a software build Object are out-of-date and require re-building. Such operations automatically examine each BldSrc object, determine if re-building is required, initiate re-building of an affected Object, and update the attributes to indicate that the BldSrc objects of the re-built Object are up-to-date.

In another aspect of the invention, the framework is implemented in a computer system that supports an object oriented programming environment such that the software build Objects that make up a software Product are extensible classes that are implemented, or instantiated, when a user initiates a software build process. The relationships between these extensible classes, as supported by the computer system, are core relationships in that they are not modifiable by the build system user. Thus, the software build Objects are modifiable by the user in that the user can specify the attributes of the software build Objects that make up the software Product to be built, so long as the structure (in terms of component objects) is consistent with the core operations defined by the framework.

Other features and advantages of the present invention should be apparent from the following description of the preferred embodiment, which illustrates, by way of example, the principles of the invention.

DESCRIPTION OF THE PREFERRED EMBODIMENT

Overview—Object Oriented Technology

Figure 1:
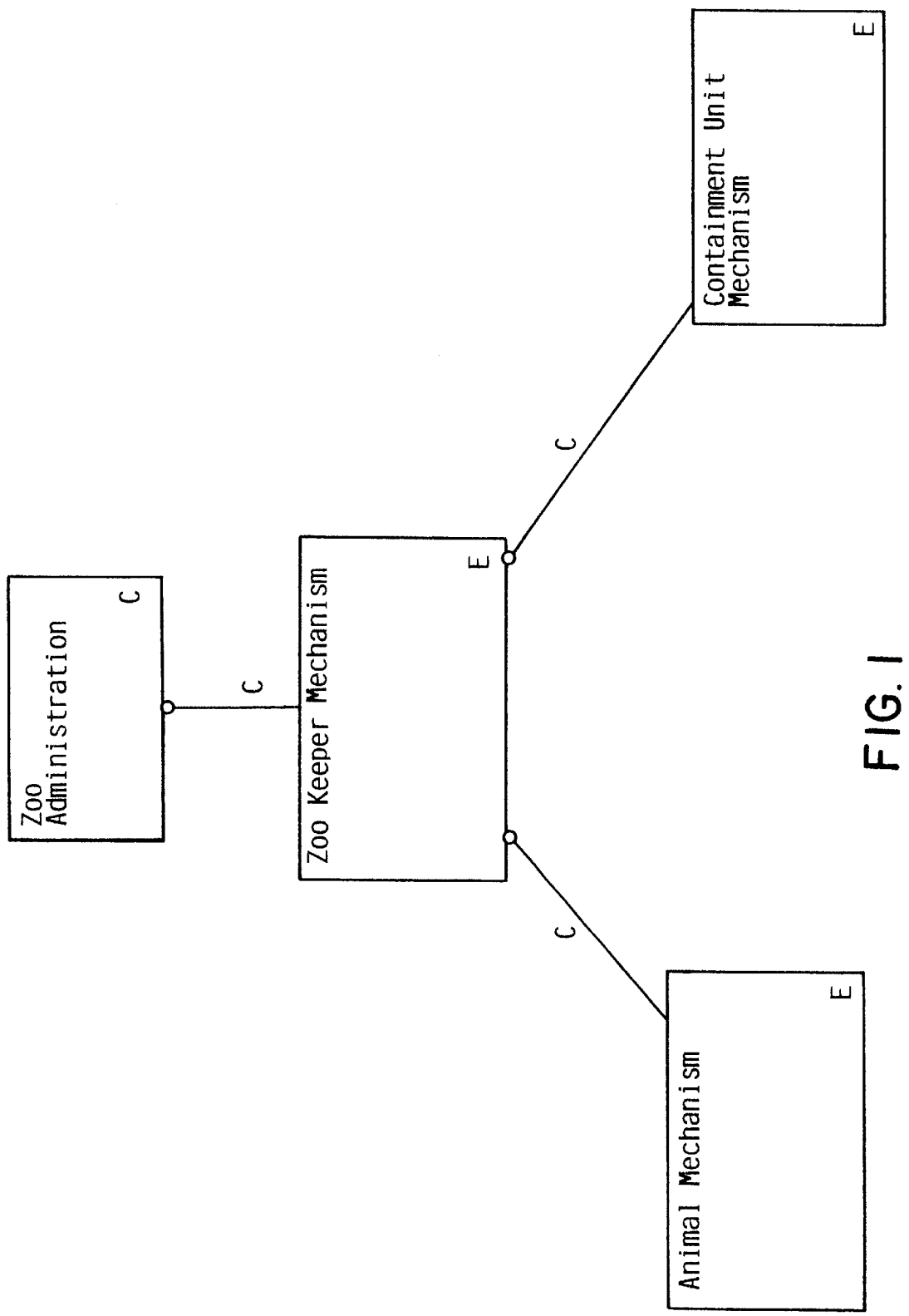
FIG. 1 is a category diagram of an exemplary Zoo Administration framework that illustrates the principles implemented by the system of the present invention.

As discussed in the Summary section, the present invention was developed using Object-Oriented (OO) framework technology. Individuals skilled in the art of OO framework technology may wish to proceed to the Detailed Description section of this specification. However, those individuals who are new to framework technology, or new to OO technology in general, should read this overview section in order to best understand the benefits and advantages of the present invention.

Object-Oriented Technology v. Procedural Technology

Though the present invention relates to a particular OO technology (i.e., OO framework technology), the reader must first understand that, in general, OO technology is significantly different than conventional, process-based technology (often called procedural technology). While both technologies can be used to solve the same problem, the ultimate solutions to the problem are always quite different. This difference stems from the fact that the design focus of procedural technology is wholly different than that of OO technology. The focus of process-based design is on the overall process that solves the problem; whereas, the focus of OO design is on how the problem can be broken down into a set of autonomous entities that can work together to provide a solution. The autonomous entities of OO technology are called objects. Stated another way, OO technology is significantly different from procedural technology because problems are broken down into sets of cooperating objects instead of into hierarchies of nested computer programs or procedures. That is, procedural technology defines a system in terms of data variables and process functions whereas OO technology defines a system in terms of objects and classes.

The Term "Framework"

There has been an evolution of terms and phrases which have particular meaning to those skilled in the art of OO design. However, the reader should note that one of the loosest definitions in the OO art is the definition of the word "framework." The word framework means different things to different people. Therefore, when comparing the characteristics of two supposed OO frameworks, the reader should take care to ensure that the comparison is indeed one of "apples to apples." As will become more clear in the forthcoming paragraphs, the term framework is used in this specification to describe an OO technology system that has been designed to have core function and extensible function. The core function is that part of the framework that is not subject to modification by the framework purchaser. The extensible function, on the other hand, is that part of the framework that has been explicitly designed to be customized and extended by the framework purchaser as part of its implementation.

OO Framework

While in general terms an OO framework can be properly characterized as a type of OO solution to a programming problem, there is nevertheless a fundamental difference between a framework and a basic OO programming solution. The difference is that frameworks are designed in a way that permits and promotes customization and extension of certain aspects of the OO solution, whereas a basic OO solution can be said to comprise a particular collection, or library, of classes and objects. In other words, frameworks provide an OO programming solution that can be customized and extended to address individualized requirements that change over time. Of course, the customization/ extension quality of frameworks is extremely valuable to purchasers (referred to herein as framework consumers) because the cost of customizing or extending a framework is much less than the cost of a replacing or reworking an existing program solution.

Therefore, when framework designers set out to solve a particular problem, they should do more than merely design individual objects and specify how those objects interrelate. They should also design the core function of the framework (i.e., that part of the framework that is not to be subject to potential customization and extension by the framework consumer) and the extensible function of the framework (i.e., that part of the framework that is to be subject to potential customization and extension). In the end, the ultimate worth of a framework rests not only on the quality of the object design, but also on the design choices involving which aspects of the framework represent core function and which aspects represent extensible function.

ZAF—An Illustrative Framework

While those skilled in the art appreciate that framework design is necessarily an intertwined and iterative process, example design choices for a simplistic framework are set forth in the paragraphs that follow. It should be understood, though, that this is only an example framework that is being used in this specification to illustrate and best explain frameworks such that the reader can better understand and appreciate the benefits and advantages of the present invention.

Framework designers determine what objects are needed for a framework mechanism by selecting objects from what is called the problem domain. The problem domain is an abstract view of the specific problem at hand. The example problem domain chosen for the illustrative framework is that of zoo administration. The specific problem presented is that of designing a framework that assists zoo keepers in the care and feeding of zoo animals. In the example, which will be referred to as a Zoo Administration Framework (ZAF), an OO framework designer would look to the zoological problem domain and decide that any ZAF would of necessity involve an abstraction that represents the relationship between zoo keepers and animals (i.e., represents how zoo keepers care for animals). The framework designer would also likely recognize that zoo animals usually live in cages, pens, tanks, and other sorts of containment units. Therefore, the framework designer also would start with the idea that the framework would have to involve abstractions or mechanisms that represent all of these fundamental entities and relationships.

How ZAF is Designed

To begin the design process, the framework designer would likely begin with what is called a category diagram. Category diagrams are used to describe frameworks at a high level and to define how the framework components relate to one another. FIG. 1 is a category diagram for the example framework ZAF. The notation used in FIG. 1, and that used in the other figures of this specification, is explained in detail in the Notation section at the end of this portion of the specification. Each entity, or icon, in a category diagram represents groupings of data objects that perform a particular function. For the purposes of illustration, assume that the framework designer decides that ZAF should be made up of four components that, at a high level perspective, will be referred to as mechanisms: a zoo administration mechanism, a zoo keeper mechanism, an animal mechanism, and a containment unit mechanism.

As shown in FIG. 1, the zoo administration mechanism has been designed to use the zoo keeper mechanism to administer the zoo. The zoo administration mechanism is therefore said to have a "using" relationship with the zoo keeper mechanism. (Again, please refer to the notation section of this specification for an explanation of this relationship and the other notation used in this specification.)

As discussed above, the zoo administration mechanism has been designed to have responsibility for overall control of ZAF. Accordingly, the zoo administration mechanism is responsible for scheduling the operation of the zoo keeper mechanism. Note also that the framework designer has designed the zoo administration mechanism to be a core function of ZAF, which means that it has been designed such that it will not be subject to potential customization and extension. The upper case block letter "C" in the category box for the zoo administration mechanism denotes this fact.

Note further that the "uses" relationship between the zoo administration mechanism and the zoo keeper mechanism also has been designed as a core function such that it is not available for ultimate customization by the framework consumer.

The zoo keeper mechanism has been designed to be generally responsible for the care and feeding of the zoo animals. Accordingly, it uses the animal and containment unit mechanisms to perform its tasks. Unlike the design of the zoo administration mechanism, however, the framework designer has designed the zoo keeper mechanism to be an extensible function, which again means that the zoo keeper mechanism has been designed to be available for modification and/or extension by the framework consumer to address future care and feeding requirements. This fact is denoted by the upper case block letter "E" in the zoo keeper mechanism category box.

The framework designer has designed the animal mechanism to represent the animal side of the interaction between zoo animals and zoo keepers. Since the animal population in the zoo is something that changes on a regular basis, the animal mechanism has similarly been designed as an extensible function. The containment unit mechanism interacts with the zoo keeper mechanism by representing individual containment units such as pens, tanks, and cages. Like the animal mechanism, the containment unit mechanism has been designed as an extensible function such that it can handle future customization and extension requirements. Please note here, however, that even though the zoo keeper, zoo animal, and containment unit mechanisms have all been designed as extensible functions, the relationships between the mechanisms have been designed to be a core function of ZAF. In other words, even though it is desirable to give ZAF's consumers flexibility relative to the zoo keeper, zoo animal, and containment unit mechanisms, it is not desirable to allow ZAF's consumers to change how these mechanisms relate to one another.

The framework designer next designs the classes and relationships that make up the mechanisms shown on FIG. 1. A class is a definition of a set of like objects. As such, a class can be thought of as an abstraction of the objects or as a definition of a type of object. From the view of a computer system, a single object represents an encapsulated set of data and the operation or a group of operations that are performed by a computer system upon that data. In fact, in a secure computer system, the only access to the information controlled by an object is via the object itself. This is why the information contained in an object is said to be encapsulated by the object.

Each class definition comprises data definitions that define the information controlled by the object and operation definitions that define the operation or operations performed by objects on the data that each object controls. In other words, a class definition defines how an object acts and reacts to other objects by defining an operation or set of operations that is/are performed on the defined data. (Please note that operations are sometimes called methods, method programs, and/or member functions.) When taken together, the defined operation(s) and data are said to be the behavior of the object. In essence, then, a class definition defines the behavior of its member object or objects.

Figure 2:
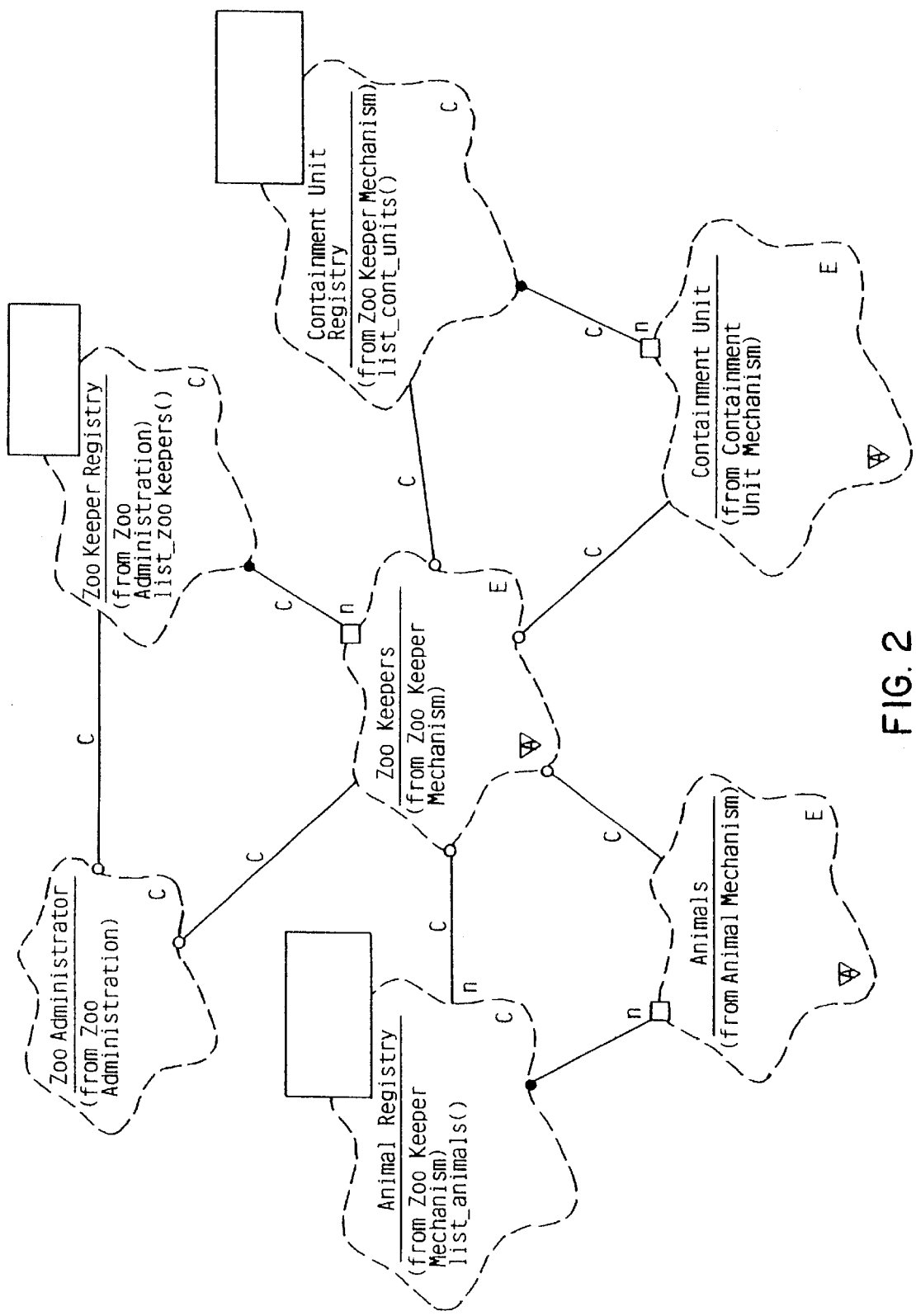
FIGS. 2, 3, 4, 5, and 6 are class diagrams for the exemplary Zoo Administration framework of FIG. 1.

FIG. 2 is an OO class diagram that shows the fundamental classes that the framework designer has designed for ZAF. Each class representation indicates its relationship to the mechanisms shown on FIG. 1. For example, the zoo keepers class is denoted as being from the Zoo Keeper mechanism. The fundamental classes of ZAF include: the zoo administrator class, which is part of the zoo administration mechanism; the zoo keeper registry class, which is also part of the zoo administration mechanism; the animal registry class, which is part of the zoo keeper mechanism; the zoo keepers class, which is also part of the zoo keeper mechanism; the containment unit registry class, which is also part of the zoo keeper mechanism; the animals class, which is part of the animal mechanism; and the containment unit class, which is part of the containment unit mechanism. It should be noted that the relationships between the classes have been designed as core functions of ZAF such that they are not available for ultimate modification by ZAF's consumers.

The zoo administrator class is the definition of the object that is responsible for the overall control of ZAF. Again, OO classes only define the objects that interact to provide a solution to the problem. However, it is by exploring the characteristics of the class definitions that one is able to understand how the objects of the framework mechanism have been designed to provide a living solution that can be customized and/or extended to address future requirements.

The zoo administration class has been designed to have a "uses" relationship with the zoo keeper registry. The framework designer has designed the zoo administration and zoo registry classes to be a core function of ZAF because the designer has decided that ZAF's consumers should not be allowed to modify the behavior of objects that are members of these class definitions. The zoo keeper registry, which has what is called a "contains by reference" relationship with the zoo keeper class, is simply a class that defines an object that is a container for all zoo keeper objects. Accordingly, the zoo keeper registry includes a definition for a $list_{13}$ zoo__keepers( ) operation. As will be described later, this operation is responsible for providing a list of zoo keeper objects to other objects that request such a list.

Figure 3:
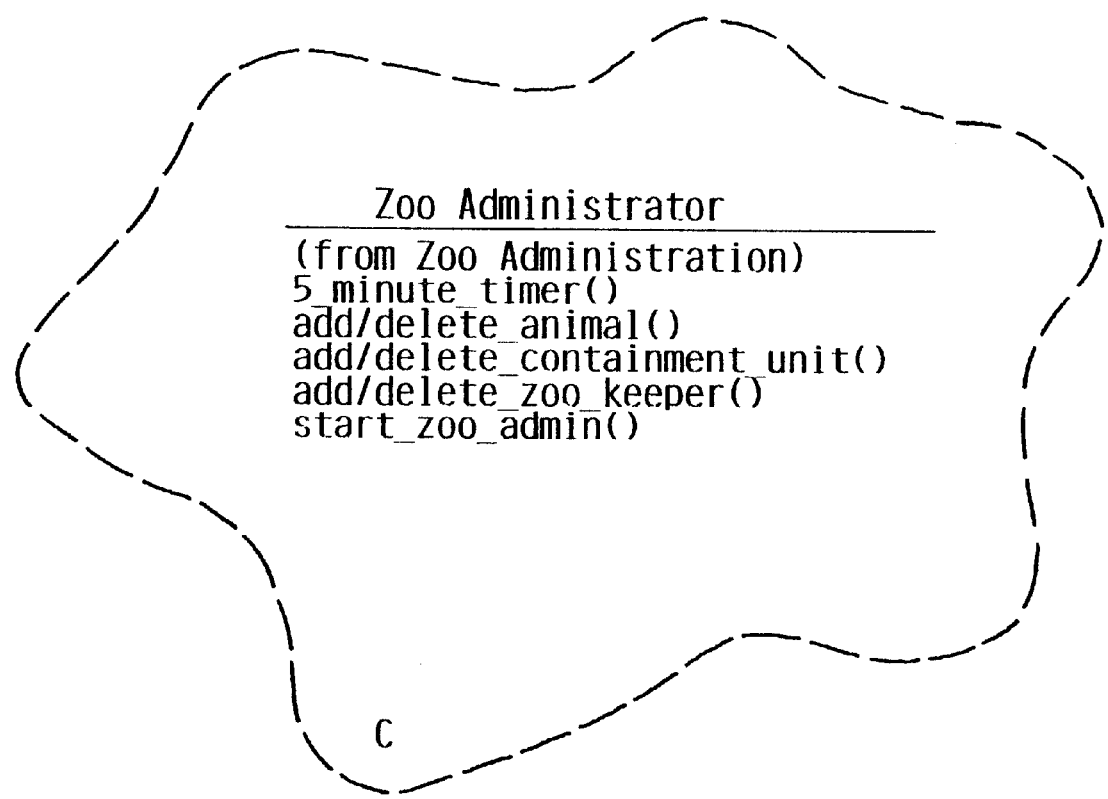

FIG. 3 shows a lower level view of the zoo administrator class. Because objects of type zoo administrator have responsibility for overall control of ZAF, the zoo administrator class has been designed to include operations that perform tasks oriented towards zoo administration. The class definition includes the following five operations: 5__minute__timer( ), add__animal( ), add__containment__unit( ), add__zoo__keeper( ), and start__zoo__admin( ).

The start__zoo__admin( ) operation is responsible for starting ZAF. That is, a user or system administrator will interact with the start__zoo__admin( ) operation to begin administration of a zoo via ZAF. The start__zoo__admin( ) operation has been designed to initiate the 5__minute__timer( ) operation such that, every five minutes, the 5__minute__timer( ) operation instructs the zoo keeper objects to go out and check on the zoo animals. The add/delete__zoo__keeper( ) operation is responsible for interacting with users of ZAF to define additional zoo keepers (i.e., additional zoo keeper classes), to add additional zoo keepers (i.e., zoo keeper objects), and to remove zoo keeper classes and/or objects. As will become clear in the forthcoming paragraphs, each zoo keeper object is responsible for performing a particular zoo task. Therefore, it is natural that a user of ZAF might well want to add a zoo keeper definition and object to handle an additional zoo task or to remove a definition or object that is no longer needed. The ZAF framework designer has provided this flexibility by designing the zoo keeper mechanism as an extensible function.

Like the add/delete__zoo__keeper( ) operation, the add/delete__animal( ) operation is responsible for interacting with users to define additional zoo animal classes and objects and also to remove classes and objects that are no longer needed. Again, it is quite natural for a zoo to need to add and remove animals. The add/delete__containment__unit( ) operation is responsible for the definition of new containment unit classes and objects and for removal of classes and/or objects that are no longer necessary. Again, the framework designer has provided such flexibility by designing the animal and containment unit mechanisms as extensible functions.

Referring back to FIG. 2, the zoo keepers class definition has a "uses" relationship with the animal registry, animals, containment unit registry, and containment units classes. Since the value of ZAF is enhanced by allowing ZAF's consumers to customize and extend the zoo keepers, animals, and containment unit classes, the ZAF framework designer has designed these classes as extensible functions. However, changing the behavior of the animal and containment unit registry classes would disrupt the basic operation of ZAF. Therefore, the framework designer has designed these classes to be core functions of ZAF.

Figure 4:
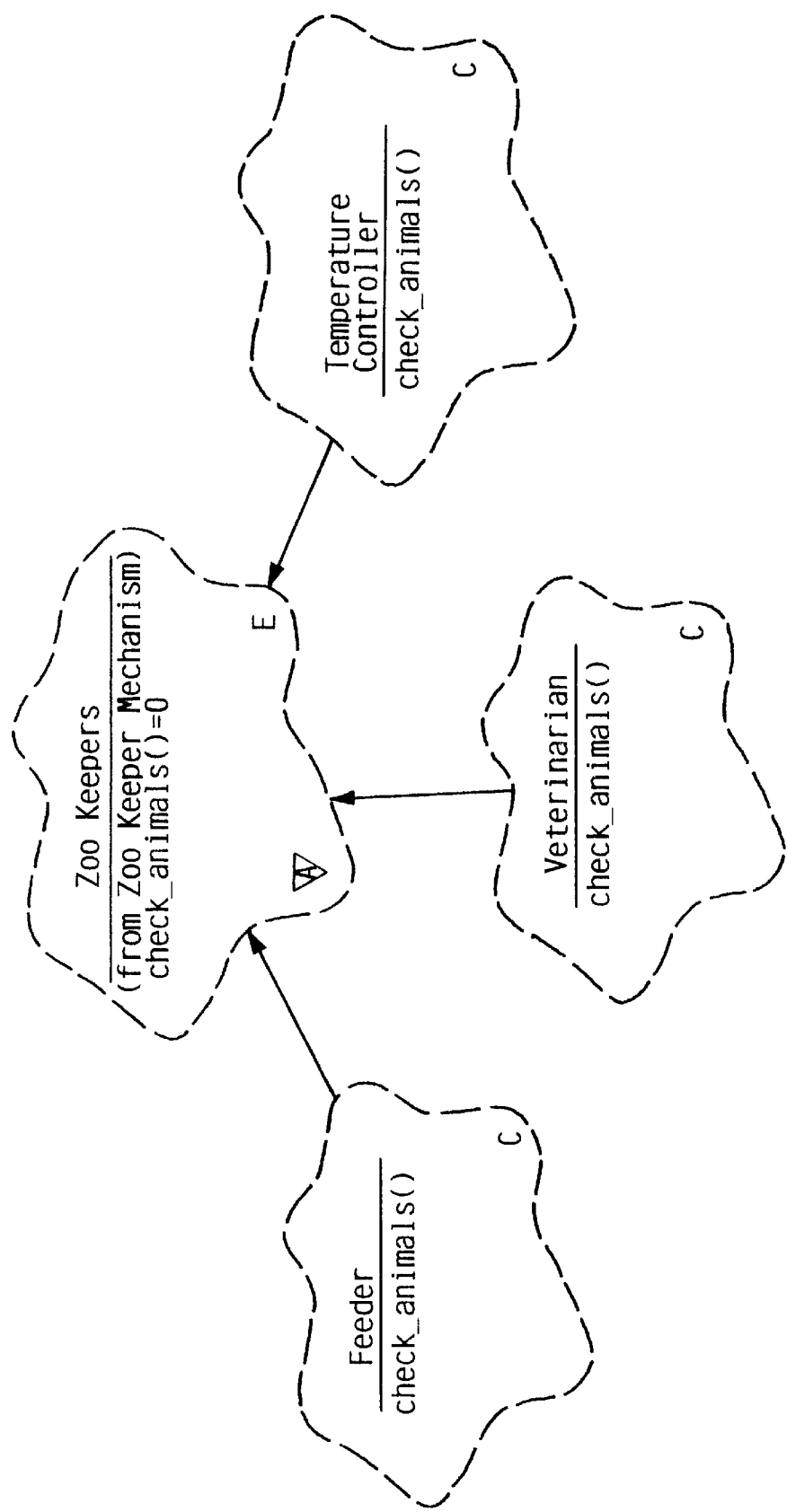

FIG. 4 is a class diagram of the zoo keeper class. However, before describing the details of FIG. 4, it is worthwhile to point out that the class definitions shown on FIG. 4 are ranked in a very simple ordering called a class hierarchy. A class, like the zoo keeper class, that represents the most generalized/abstract class in a class hierarchy is referred to as the base class of the hierarchy. The ordering of classes in a class hierarchy goes from most general to least general (i.e., from general to specific). Less general classes (e.g., the feeder class) are said to inherit characteristics from the more general class or classes (i.e., the zoo keeper class in this case). As such, class definitions feeder, veterinarian, and temperature controller are said to be subclasses of the zoo keeper class. Inheritance mechanisms will be explored in more detail in the discussion associated with FIG. 5.

As shown on FIG. 4, the zoo keeper class definition contains a single operation definition, the check__animals( ) operation definition. The reader should also note that the zoo keepers class definition is marked as being an abstract class. Abstract classes are not designed to have objects created as their members, but are instead used to define a common interface/protocol for their subclasses. A class is said to be an abstract class when at least one of its operation definitions is a pure virtual operation definition. Pure virtual operation definitions are designed for the sole purpose of defining a common interface for subclass definition of that operation. In other words, the design of the actual behavior (i.e., the data and operations) is left to the subclasses themselves. In the case of the zoo keeper class definition, the feeder, veterinarian, and temperature controller subclasses define specific implementations of the pure virtual check__animals( ) operation definition that is contained in the zoo keeper class. An operation is marked as a pure virtual operation when it is set equal to 0.

It is important to note, though, that the common interface of a pure virtual operation definition must be honored by all subclasses such that requesting objects (called client objects) can use subclass member objects (called server objects) without needing to know the particular subclass of the server object. For example, whenever the object defined by the zoo administrator class needs a particular action performed, it interacts with a zoo keeper object. Because the interface to these objects was defined in abstract, base class zoo keeper and preserved in the subclass definitions for the check__animals( ) operation, the zoo administrator object need not have special knowledge about the subclasses of any of the server objects. This has the effect of decoupling the need for the action (i.e., on the part of the zoo administrator object) from the way in which the action is carried out (i.e., by one of the objects of the zoo keepers subclasses). Designs (such as the ZAF design) that take advantage of the characteristics of abstract classes are said to be polymorphic.

Polymorphism is extremely important to OO framework design because it allows the way in which something is done (called the implementation) to be changed or extended without effecting the mechanisms that depend on the fact that the action is actually performed. In other words, client objects need only understand that certain objects perform certain functions, not how those functions are actually carried out. This is one way in which a properly designed OO framework can be readily customized and extended to satisfy future requirements.

Figure 5:
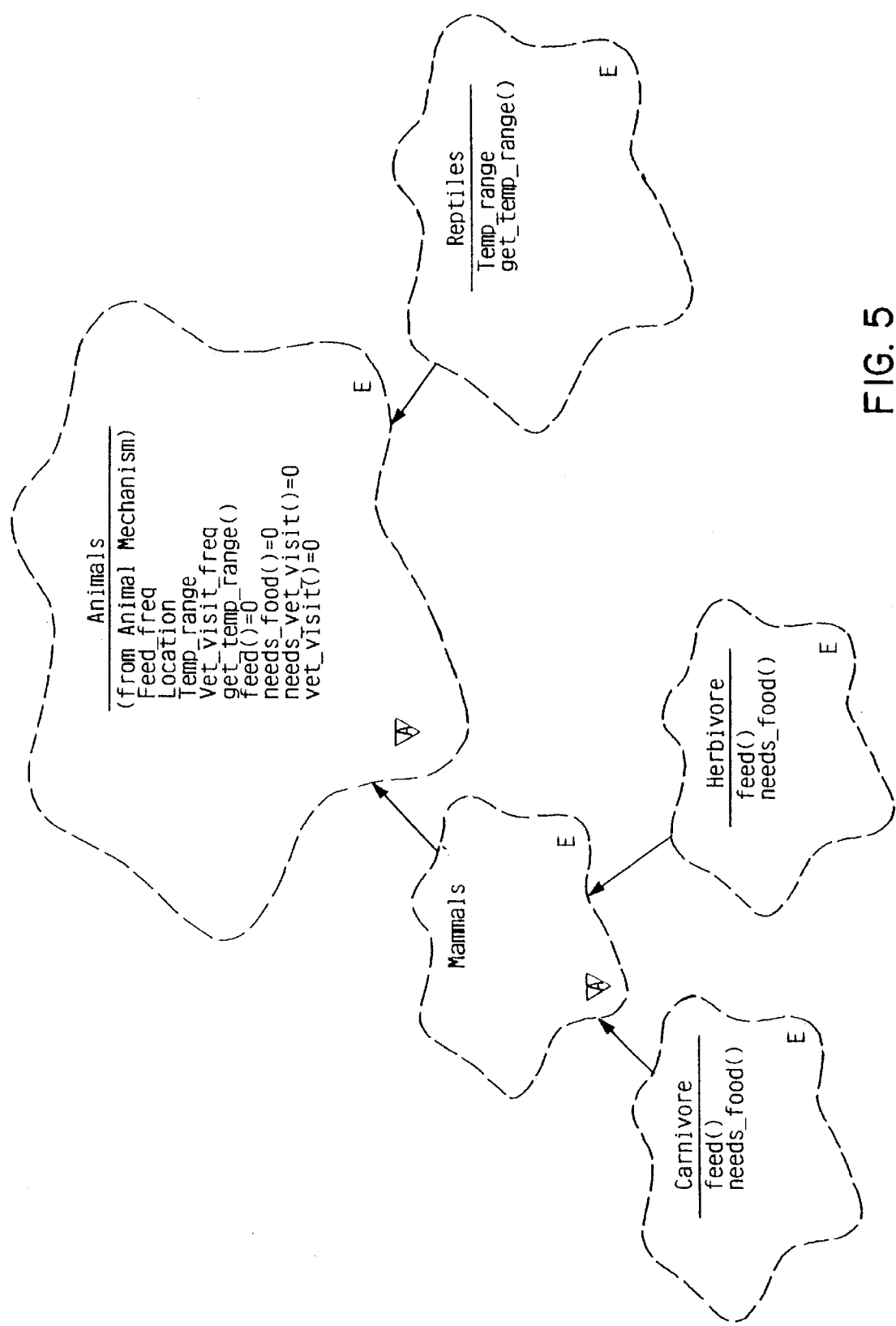

As previously discussed, the framework designer has designed the ZAF framework such that zoo keeper objects interact with animal and containment unit objects to perform their respective tasks. FIG. 5 is a class diagram for the class hierarchy of the abstract class animal. Because the animal class definition is responsible for representing the characteristics and behavior of zoo animals, the framework designer has designed the abstract class animal in a way that reflects this responsibility. As shown, the example class definition for animal includes data definitions feed_freq, location, and temp_range and operation definitions get_temp_range( ), feed( ), needs_food( ), needs_vet_visit( ), and vet_visit( ).

For the purposes of this framework overview, it is not necessary to explore each definition in detail. However, the temp_range data definition and the get_temp_range( ) and feed( ) operation definitions are good examples of well thought out framework design choices.

The feed( ) operation definition is designed to perform the actual feeding of the animals (i.e., through specific feeding apparatus, which is not shown). The feed( ) operation is a pure virtual operation. Again, this means that the design of the class is such that the actual mechanism that performs the needed function has been left to be defined by the subclasses. Requiring subclass definition is a good design choice in cases like this where objects that are created as members of the subclasses have particularized needs. In the ZAF framework, for example, each type of animal is likely to have need for a particularized feeding apparatus, which not only makes definition of a generic feed( ) operation difficult, but valueless.

By way of comparison, the framework designer has explicitly designed the get_temp_range( ) operation such that it is not a pure virtual operation definition. This means that get_temp_range( ) has been generically defined as a default operation. As such, it is considered a virtual operation. Default operations are used to provide generic function to subclasses. The subclasses can simply use the default operations or they can customize or extent the default operations by redefinition. Redefinition of a default operation is called overriding the default operation.

Mammals is a subclass of the class animals and, as such, the mammals class inherits all of the characteristics of the animals class. The mammals class is also designed as an abstract class, which again means that it has not been designed to have objects created as its members, but has instead been designed to provide a common interface for its subclasses. Subclass mammal is further subclassed into classes carnivore and herbivore.

Because definition of the feed( ) operation has been left up to the subclasses, the subclasses carnivore and herbivore each have their own definition of the feed( ) operation. Again, this is a good design choice because meat-eating carnivores are going to have different needs than their plant-eating counterparts.

Temp_range is a data definition for the range of temperatures that coincides with that of the specific animal's natural habitat and the get_temp_range( ) operation definition is designed to retrieve the temp_range for a specific animal and return it to a requesting client object. Subclass reptiles contains its own data definition for temp_range and its own definition for the get_temp_range( ) operation. ZAF has been designed this way to point out that data definitions can be overridden just like operation definitions. Since many reptiles live in desert conditions, where nights can be very cold and days very hot, the default temp_range definition has been overridden in the reptiles class to include time and temperature information (not explicitly shown on FIG. 5). This is another good design choice because it allows ZAF to treat reptile containment units differently than other containment units by allowing temperature adjustments to be made based on the time of day as well as on the current temperature of the containment unit itself.

Figure 6:
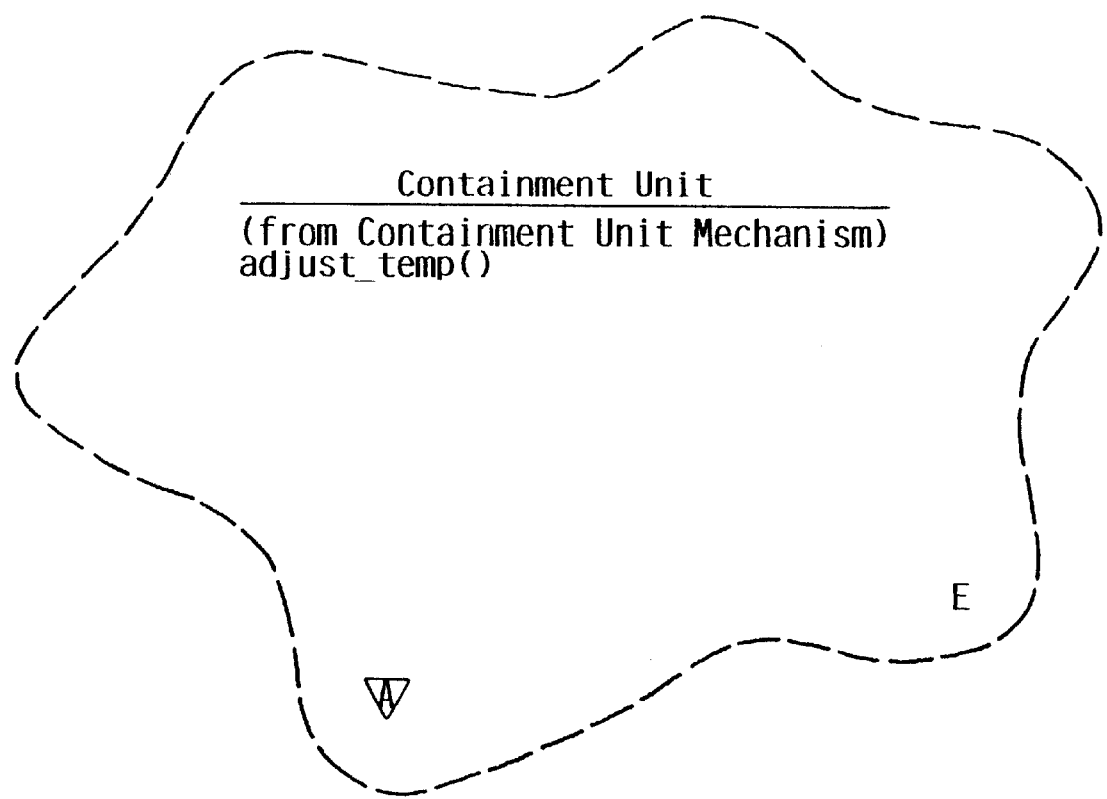

FIG. 6 is a class diagram showing a lower level view of the containment unit class. The containment unit class contains a virtual operation definition adjust_temp( ). The adjust_temp( ) definition defines both the interface and mechanism used to actually adjust the temperature in the containment units of the zoo (i.e., via heating and cooling mechanisms that are not shown).

How the ZAF Objects Interact

Beyond designing the objects that make up the solution to the specific programming problem, the framework designer must also design how the individual objects interrelate. In other words, the objects must interrelate in way that takes advantage of the manner in which they were designed. As discussed, the way in which the defined operations of an object operate on the data defined for the object is called the object's behavior. While objects may be characterized as autonomous entities, it is still very important that each object exhibit a consistent behavior when interrelating with other objects. Consistent behavior is important because objects depend upon the consistent behavior of other objects so that they themselves can exhibit consistent behavior. In fact, consistent behavior is so important that an object's behavior is often referred to as the contract the object has with the other objects. When an object does not exhibit a consistent behavior, it is said to have violated its contract with the other objects.

When an operation of one object needs access to the data controlled by a second object, it is considered to be a client of the second object. To access the data controlled by the second object, one of the operations of the client will call or invoke one of the operations of the second object to gain access to the data controlled by that object. One of the operations of the called object (i.e., a server operation in this case) is then executed to access and/or manipulate the data controlled by the called object.

Figure 7:
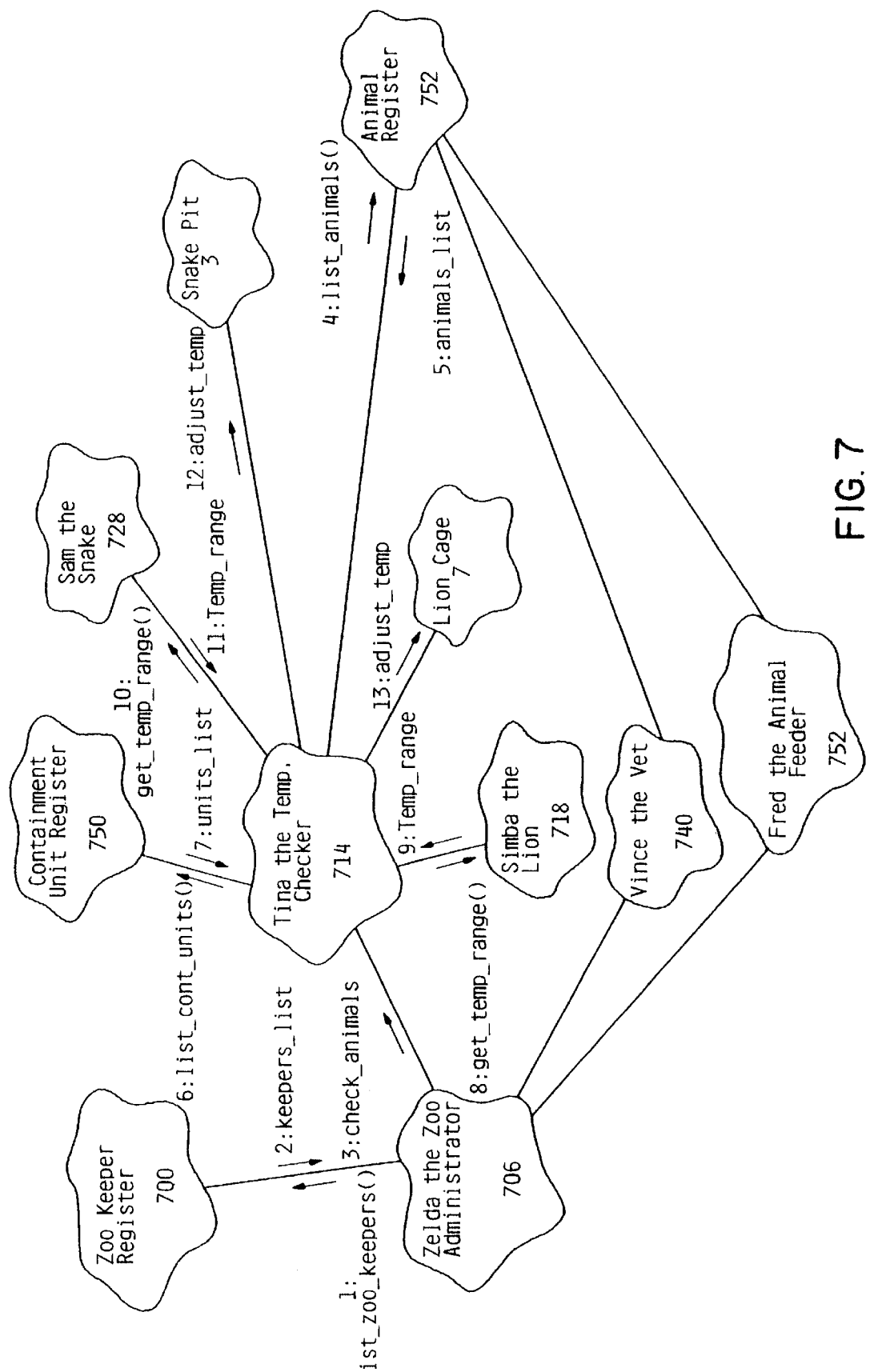
FIG. 7 is an object diagram for the exemplary framework of FIGS. 1 through 6.

FIG. 7 is an object diagram showing how the example objects of ZAF interact to assist zoo personnel in operating the zoo. A detailed analysis of the interaction of all of the ZAF objects is unnecessary for the purposes of this overview. However, the reader should review the following simple control flow to obtain a rudimentary understanding of how objects in an OO environment interact to solve problems.

As mentioned, an object is created to be a member of a particular class. Therefore, the object Zelda the Zoo Administrator 706 is an object that is a member (actually, the only member) of the zoo administrator class. As such, object Zelda is responsible for overall control of ZAF. All of the zoo keeper objects have registered with the Zoo Keeper Register object [object 700]. Therefore, object Zelda obtains a list of the current zoo keepers by calling the list_zoo_ keepers( ) operation [step 1] of the Zoo Keeper Register object. The Zoo Keeper Register object 700 has been created as a member of the zoo keeper register class. For the purposes of illustration, assume that this occurs every five minutes as part of Zelda's 5_minute_timer( ) operation. The Zoo Keeper Register object then responds with the zoo keepers list [step 2]. The list of zoo keepers includes Tina the Temperature Checker [object 714], Vince the Vet. [object 740], and Fred the Animal Feeder [object 752]. Each zoo keeper has been created as a member of the zoo keepers class. In particular, objects Tina the Temp. Checker, Vince the Vet., and Fred the Feeder are respectively members of the temperature controller, veterinarian, and feeder subclasses.

Once the list of current zoo keepers has been returned to object Zelda 706, object Zelda instructs each zoo keeper in the list to check the animals by calling the check_animals( ) operation of each zoo keeper object. Only the call to Tina the Temp. Checker is shown, indicated as step 3. It should be noted that object Zelda did not need to understand the types of zoo keepers that were in the zoo keeper list, the number of zoo keeper objects in the list, or the specialized characteristics of any one zoo keeper object. Object Zelda uses the same interface (i.e., the check_animals( ) operation) to communicate with each zoo keeper object. It is then up to the individual zoo keeper objects to perform the task for which they have been created. Each zoo keeper object performs its assigned task through use of its own check_animals( ) operation. For example, object Tina's check_animals( ) operation retrieves a list of current animals from the animal registry object [object 753 ] by calling the list_animals( ) operation [step 4] and then a list of containment units from the containment unit register object [object 750 ] by calling the list_cont_units( ) operation [step 6]. Upon examining the animal list, object Tina's check_animals( ) operation determines that there are only two animals currently registered in the zoo, Sam the Snake [object 728] and Simba the Lion [object 718].

Object Tina's check_animals( ) operation then calls the get_temp_range( ) operations to get temperature ranges from objects Sam and Simba [steps 8 and 10]. Once the temperature ranges have been returned, the check_animals( ) operation of object Tina determines which containment units house the respective animals (i.e., Simba and Sam) and then calls the adjust_temp( ) operation of the appropriate containment unit (i.e., Lion Cage 7 in the case of object Simba and Snake Pit 3 in the case of object Sam) to adjust the temperature of the containment units [steps 12 and 13].

The adjust_temp( ) operation of each containment unit then completes the control flow by proceeding to adjust the temperature in a way that is appropriate for the animals contained in each containment unit. (That is, the temperature is adjusted based on time and temperature for Snake Pit 3 and based on time alone for Lion Cage 7.) The reader should note that the relationship between the check_animals( ) operation and the adjust temp( ) operations is polymorphic. In other words, the check_animals( ) operation of object Tina 714 does not require specialized knowledge about how each adjust_temp( ) operation performs its task. The check_animals( ) operation merely had to abide by the interface and call the adjust_temp( ) operations. After that, it is up to the individual adjust_temp( ) operations to carry our their tasks in the proper manner.

At this point, it is again worthwhile to point out that the ZAF system is an extremely simplistic framework that has been presented to help novice readers understand some basic framework concepts so as to better appreciate the benefits and advantages of the present invention. These benefits and advantages will become more clear upon reference to the following Detailed Description.

Detailed Description of the Preferred Embodiment

Figure 8:
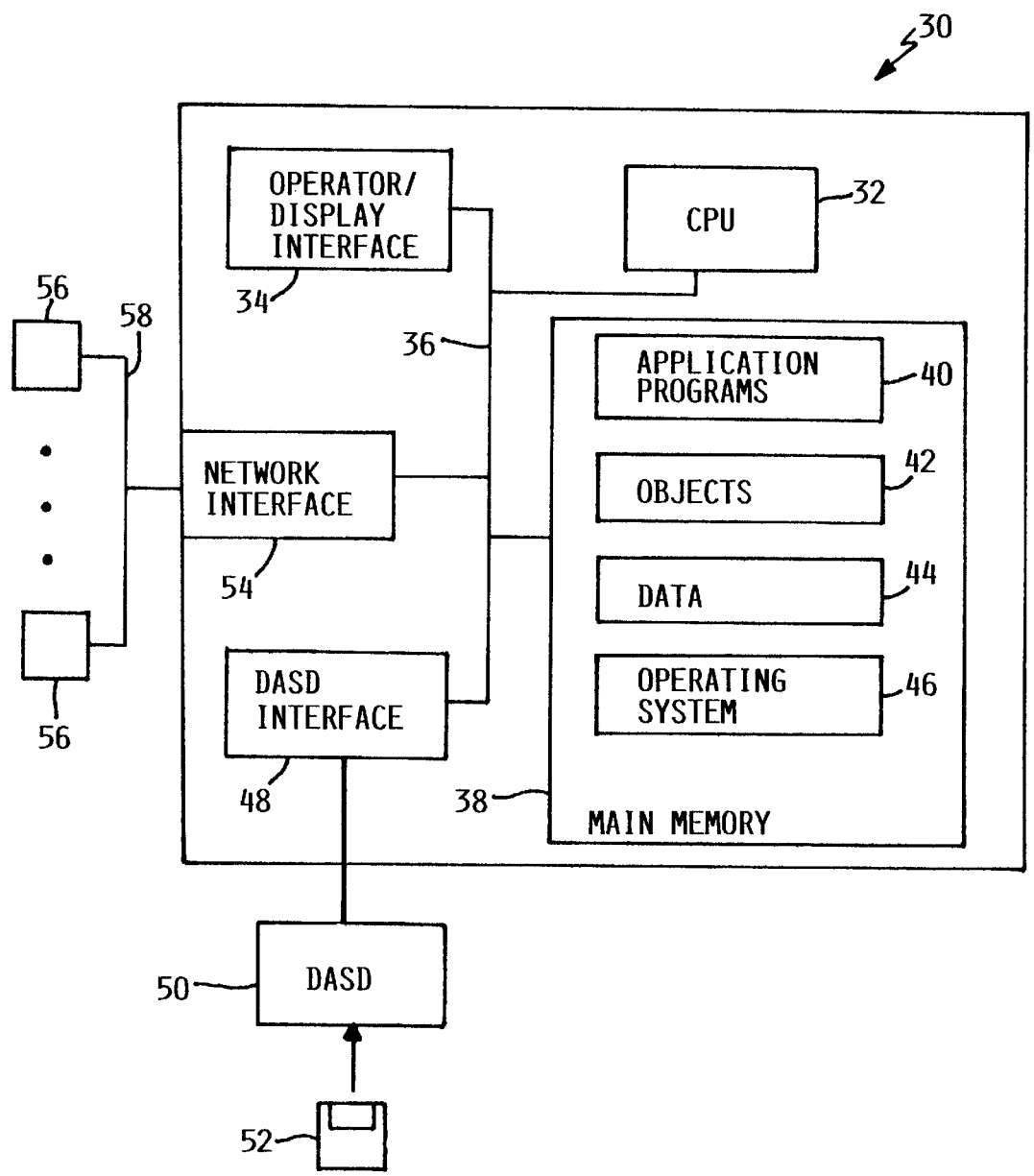
FIG. 8 is a functional block diagram of a computer processing system constructed in accordance with the present invention.

FIG. 8 is a block diagram of a computer system 30 constructed in accordance with the present invention. The computer system includes a central processing unit (CPU) 32 that operates in response to operator commands, which it receives from an operator/display interface 34 to which it is connected by a system bus 36. The CPU also communicates over the system bus with a main memory 38. The main memory is illustrated containing a variety of data structures, including application programs 40, objects 42, data 44, and an operating system 46. The main memory 38 is represented as a single entity, but those skilled in the art will appreciate that the main memory can comprise a combination of random access memory (RAM), hard disk drives, optical disk drives, and other storage devices containing logically segmented storage locations.

The operating system 46 preferably supports an object oriented programming environment such as provided, for example, by the C++ programming language. The application programs 40 are invoked, or launched, by a user through the operator/display interface 34. The application programs can be written in a variety of languages, including C++. The objects 42 are object data structures of an object oriented programming language, such as C++.

The computer system 30 also includes a direct access storage device (DASD) interface 48 that is connected to the system bus 36 and also is connected to a DASD 50. Those skilled in the art will appreciate that the DASD 50 can receive and read from program products comprising machine-readable storage devices 52, such as magnetic media disks on which are recorded program instructions whose execution implements the framework of the present invention. The storage devices 52 also can comprise, for example, media such as optical disks and other machine-readable storage devices. The computer system 30 also includes a network interface 54 that permits communication between the CPU 32 and other computer systems 56 over a network 58. The other computer systems 56 can comprise, for example, computer systems similar in construction to the exemplary computer system 30. In that way, the computer system 30 can receive data into the main memory 38 over the network 58 after communication between the computer systems has been established by well-known methods that will be understood by those skilled in the art without further explanation.

Figure 9:
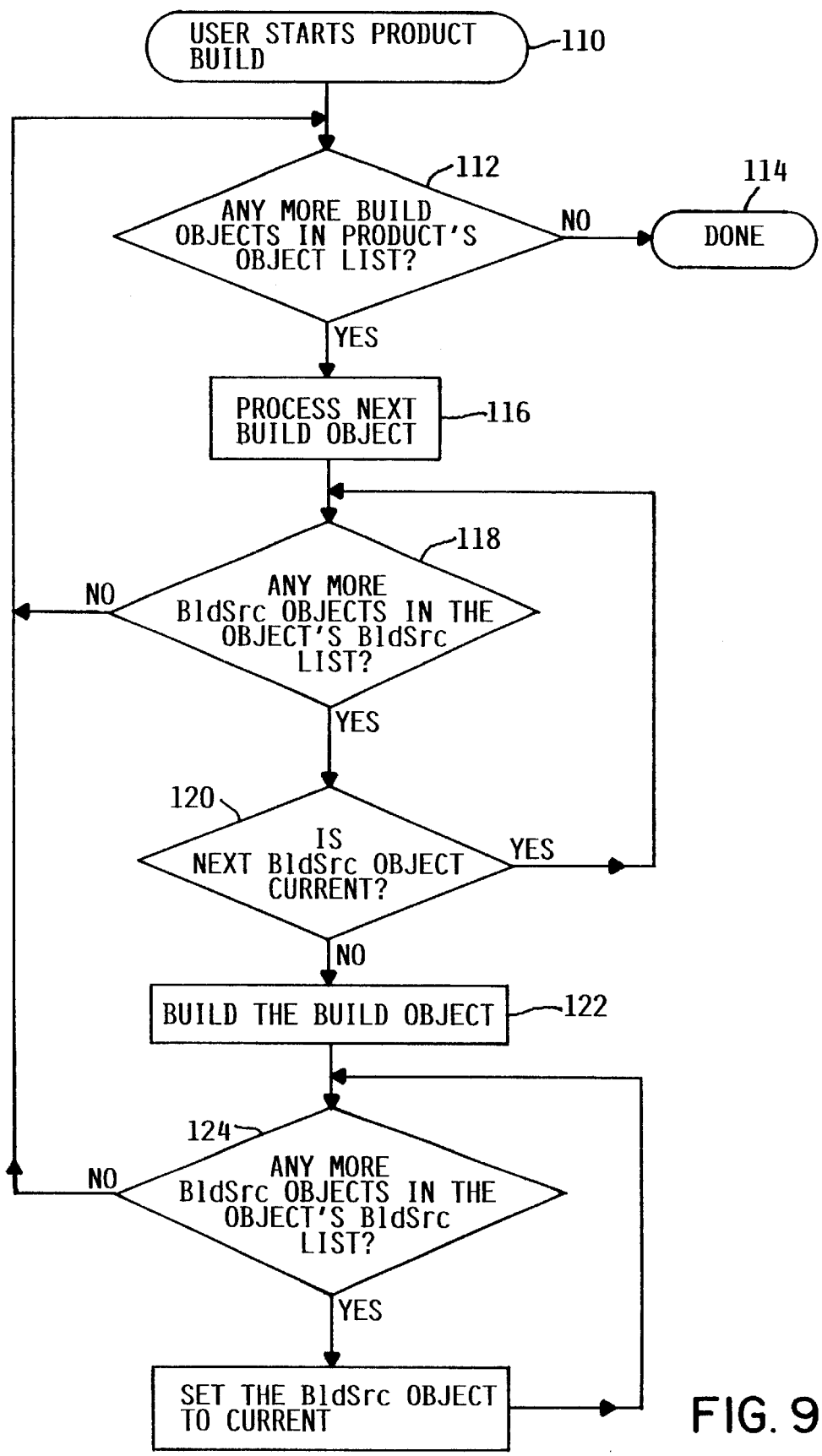
FIG. 9 is a flow diagram that illustrates the processing steps performed by the framework mechanism of the computer processing system illustrated in FIG. 8.

FIG. 9 is a flow diagram that represents the processing steps executed by the computer system illustrated in FIG. 8 in performing software build processing. The software build process is initiated by a user in a manner dependent on the particular implementation of the computer system. For example, the software build process could be initiated in response to user input at a keyboard device upon receipt of source code over the network connection. Such initiation is represented in FIG. 9 by the flow diagram box numbered 110.

A software product that is to be built (referred to as an object of the class called Product) is comprised of build objects from a class called Object. In the preferred embodiment shown, each Object comprises a list of four build objects. Each of the four build objects is derived from a class called BldSrc (Build Source), which includes two build level attribute classes, one called BldData and one called Bld- Level. Thus, each instance of an Object comprises a list of four build objects that include a BldData and a BldLevel. During the build process, the system checks each build object in a Product's Object list. The checking process is represented in FIG. 9 by the decision box numbered 112. If all of the build objects in a Product's Object list have already been processed, a negative outcome at the decision box 112, then the build process for that Object is complete and software build halts, as represented by the termination box numbered 114. If there are any unprocessed build objects in the Product's Object list, an affirmative outcome at the decision box numbered 112, then processing continues with the next remaining build object, as represented by the flow diagram box numbered 116.

As described further below, the four object classes that are a kind of the object class called BldSrc are called ControlInfo, SourceInfo, ProcessInfo, and ProcessOutput. The flow diagram box numbered 116 indicates that an object from each of the four BldSrc objects of the Product's Objects are serially processed. To process the BldSrc objects, the system examines each of the objects ControlInfo, SourceInfo, ProcessInfo, and ProcessOutput in turn. Such serial examination is represented by the decision box numbered 118. If all four of the BldSrc objects have been examined already, a negative outcome at the decision box 118, then processing for the pending Object is complete and processing continues with the next software build Object, as indicated by the return of processing from the decision box 118 to the flow diagram box 112. If any of the four BldSrc objects has not yet been examined, an affirmative outcome at the decision box numbered 118, then processing continues with examination of the next BldSrc object, as represented by the decision box numbered 120.

The object examination step comprises checking to determine if the BldSrc object is a current build version. In particular, software build processing is performed with reference to an existing built version (except in the case of initial build processing, described further below). The BldSrc build level classes BldData and BldLevel are used, respectively, to contain the source data for processing and to indicate whether that source object is current or out of date. The BldLevel class includes one attribute that indicates the level or version number of the source object that was used to build the Object, and another that indicates the current level of the BldSrc source object being examined. The build level can comprise a version number that is changed with each software source update or can comprise the present calendar date, for example. The selection of the attribute used for the build level is dependent on the particular system implementation and is the choice of the user.

Regardless of the precise attribute selected for the indication of build level, a comparison of the two build level attributes of the BldSrc object being examined gives an indication of whether that object is current. That is, if the level of the BldSrc object used to build the Object (the next BldSrc object) is the same as the level of the BldSrc object presently being examined, then no change to the source object has been made since the time of the last software build. If the level of the built BldSrc object and the level of the BldSrc object being examined are not the same, then the built BldSrc object is not current. Therefore, a change has been made to the source object since the time of the last software build and the build process must be carried out for the Object. The decision box numbered 120 in FIG. 9 represents the level checking process.

If the built BldSrc object is current, an affirmative outcome at the decision box numbered 120, then processing continues at the decision box numbered 118 with examining the next of the four BldSrc objects remaining. If the built BldSrc object is not current, a negative outcome at the decision box 120, then processing continues with building the BldSrc object being examined. If any one of the four BldSrc objects ControlInfo, SourceInfo, ProcessInfo, and ProcessOutput is not current, then the BldSrc object of which they are a part is re-built using all four objects. That is, the software build Object having the out-of-date BldSrc object is subjected to the software build process, as specified by the computer system implementation illustrated in FIG. 8, and all four objects are used. The build process is represented by the flow diagram box numbered 122.

Those skilled in the art will understand that the software build process is a method specified by the system user in accordance with the system on which the framework is implemented. Thus, if the Product is a FORTRAN-language software application, then the processing step likely will comprise calling a FORTRAN compiler and providing it with the FORTRAN-language BldSrc object. The compiled BldSrc object is the result of the build processing.

After the BldSrc object is built, the level of all four BldSrc objects is set current so that they are not improperly detected as being out of date on the next examination step. For example, suppose the system checks each of the BldSrc objects in the order of first the ControlInfo object, next the SourceInfo object, followed by the ProcessInfo object, and finally the ProcessOutput object. If the ControlInfo object is current but the SourceInfo object is not current, then the Object is subjected to the build process. All four BldSrc objects are involved in the build process and so all four become current. Therefore each BldSrc object, in turn, must be set to current. Setting the BldSrc objects current is represented by the flow diagram loop comprising the decision box numbered 124 and the flow diagram box numbered 126. After all the BldSrc objects have been set current, an affirmative outcome at the decision box 124, processing continues with checking remaining software build objects in the Product Object list at the decision box numbered 112.

The present invention provides an object oriented framework. The operation of the software build system developed using the framework can be understood with reference to the procedural flow diagram of FIG. 9. Persons skilled in the art, however, will appreciate that the framework objects, their relationships, and their processing also can be precisely and completely described in terms of object oriented programming representations. Therefore, the framework of the preferred embodiment will next be described in terms of category diagrams and object diagrams similar to those described above in conjunction with FIGS. 1 through 7 for the zoo keeper example, in accordance with the software build framework mechanism classes described above.

Figure 10:
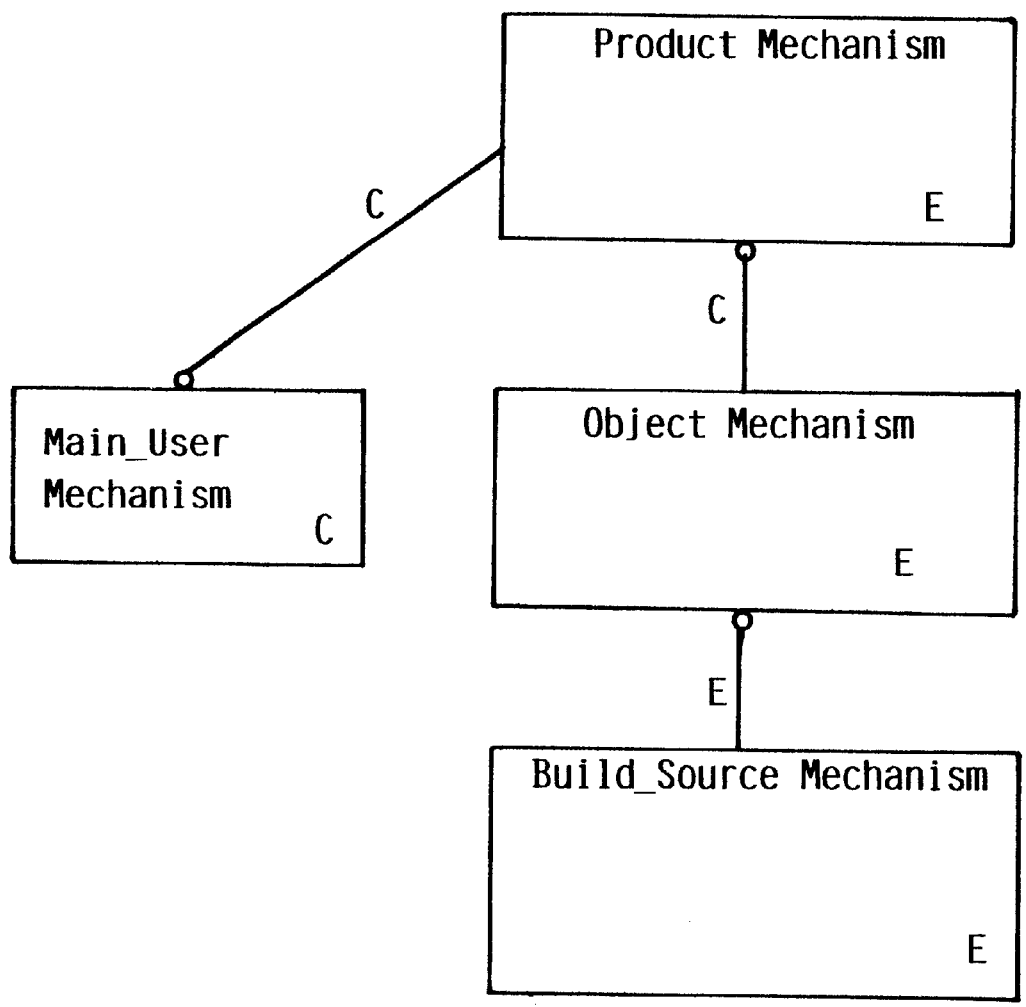
FIG. 10 is a top-level category diagram representation of the framework mechanism of the computer processing system illustrated in FIG. 8.

FIG. 10 is a category diagram for the framework implemented in the computer system of FIG. 8. Those skilled in the art will appreciate that the categories illustrated in FIG. 10 represent collections of object oriented programming (OOP) objects that encapsulate data attributes and behaviors and are stored in the main memory illustrated in the block diagram of FIG. 8. Such objects can be implemented, for example, in a computer system operating environment that supports the C++ programming language.

The FIG. 10 category diagram representation of the framework shows four primary components, or mechanisms, comprising a User_Mechanism, a Product Mechanism, an Object Mechanism, and a Build_Source Mechanism. The User_Mechanism is the mechanism that initiates a software build procedure. This mechanism can be simply a user interface through which a framework user initiates processing and communicates with the system. It can comprise, for example, the operator/display interface illustrated in FIG. 8. Thus, the User_Mechanism is not necessarily an object oriented category or class collection at all. The provider of the framework decides what form the User_Mechanism will take and incorporates the mechanism in the framework. In the preferred embodiment, all software build operations are initiated by an operator action through the operator/display interface.

Whatever form the User_Mechanism takes, that form is fixed for the software build framework. Therefore, the User_Mechanism is shown as a core class, indicated by the "C" in its category box. The Product Mechanism represents the category into which the software build product is placed. The Object Mechanism represents the category from which the built software modules are derived. The Build_Source Mechanism represents the category containing the source modules from which the product is built. The association relationships indicated by the connecting lines between the category boxes indicate core "using" relationships from the User Mechanism to the Product Mechanism, from the Product Mechanism to the Object Mechanism, and from the Object Mechanism to the Build_Source Mechanism. Thus, the way in which the objects making up these mechanisms interact with the other objects is fixed by the framework provider and cannot be changed by the framework user.

Figure 11A:
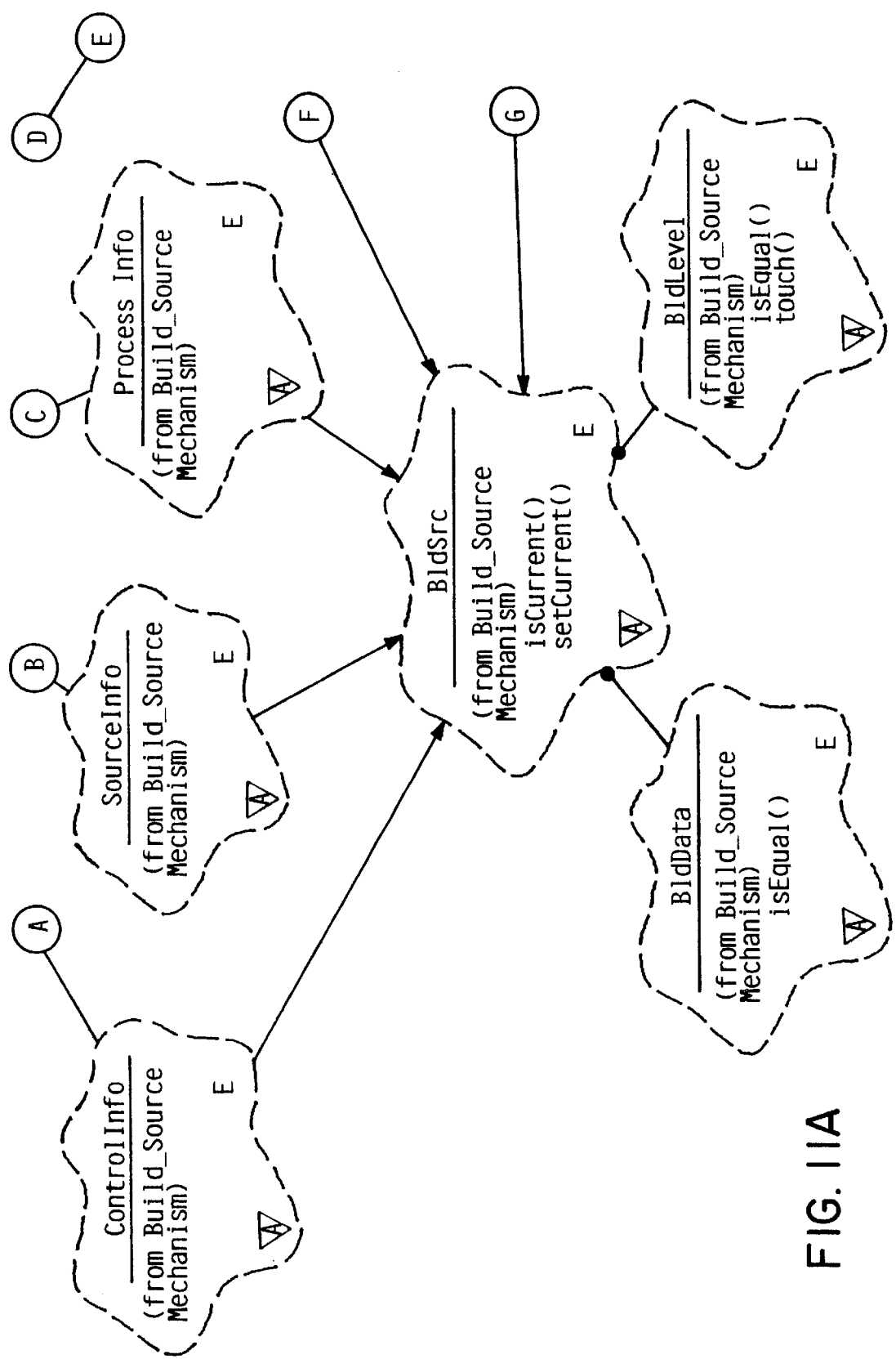
FIG. 11 is a class diagram representation of the object classes implemented by the computer processing system illustrated in FIG. 8.
Figure 11B:
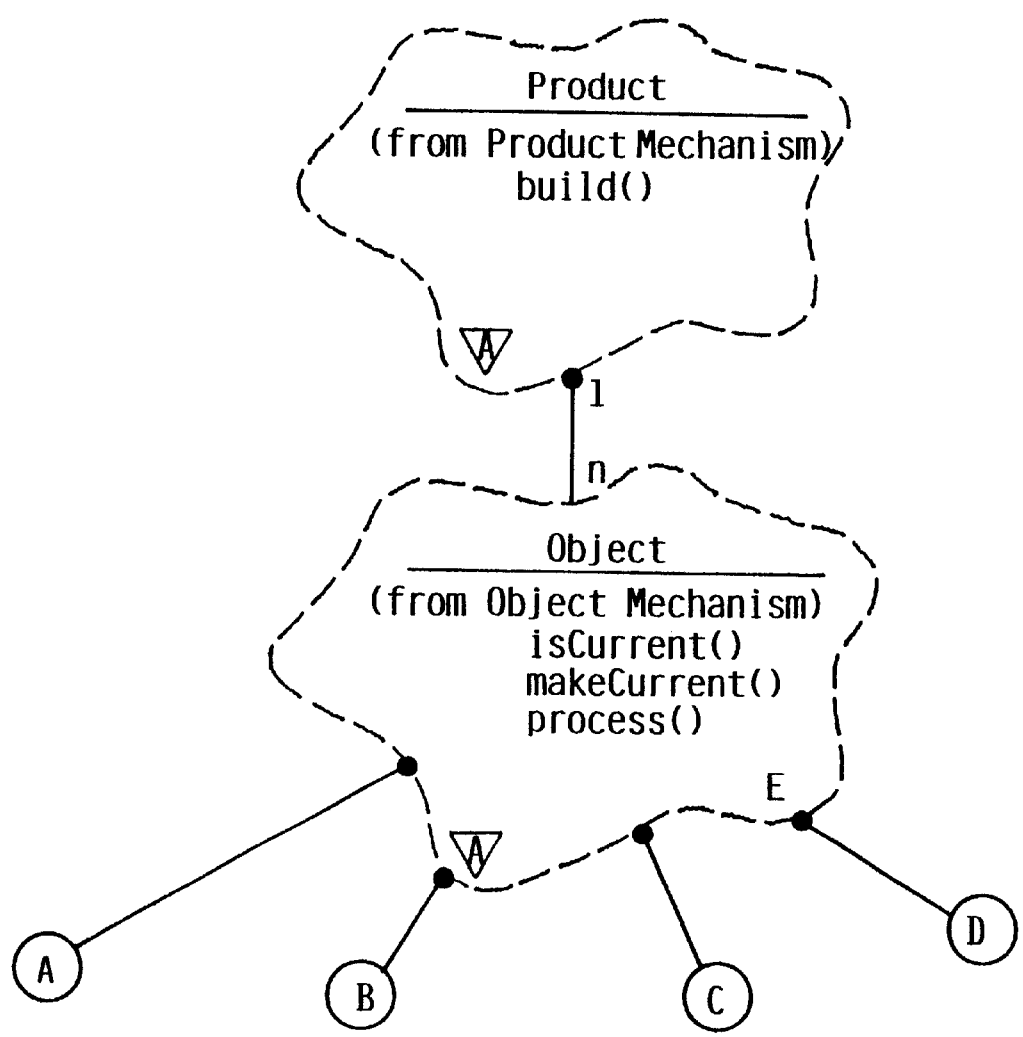
Figure 11C:
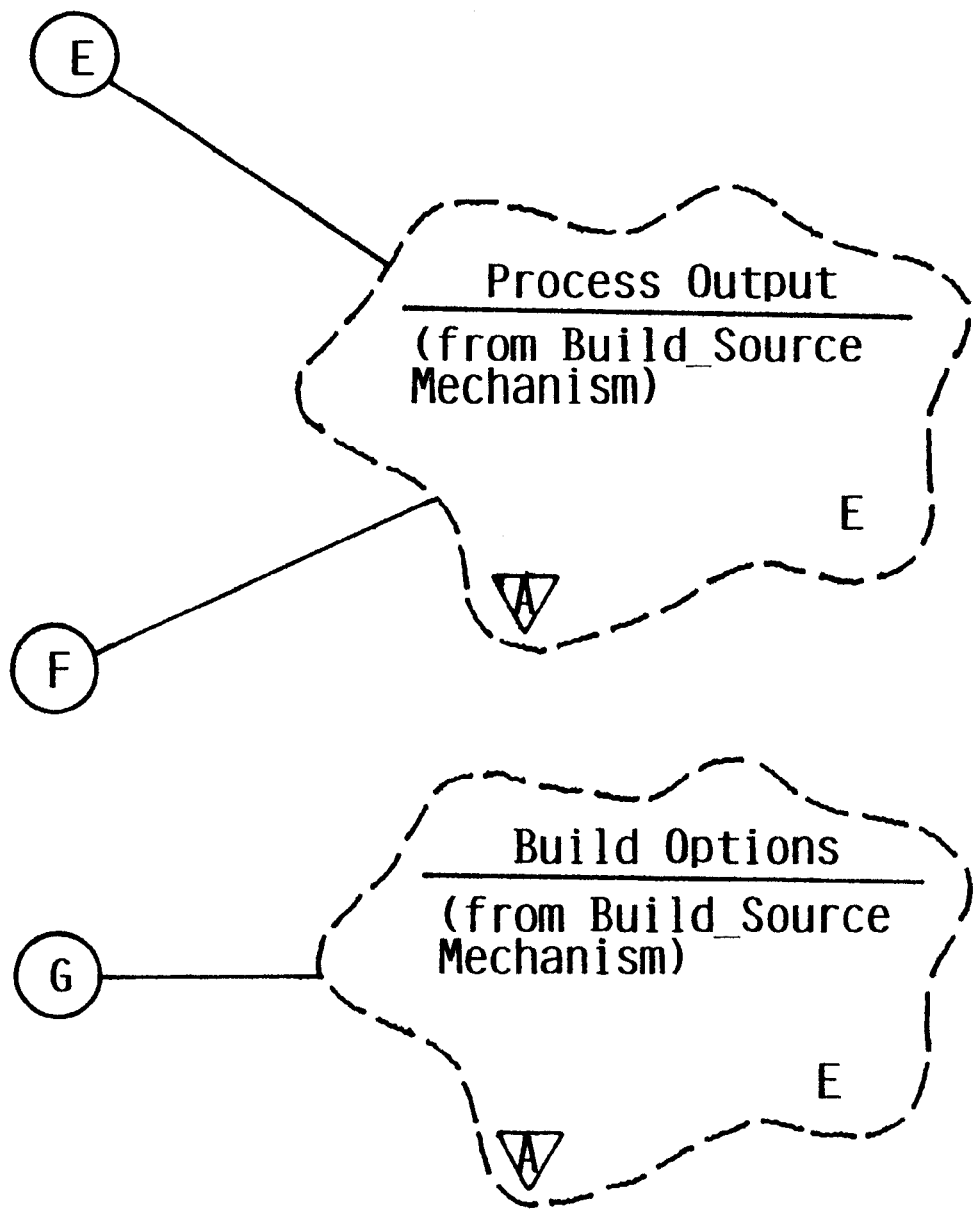

FIG. 11 is a class diagram that illustrates characteristics of the primary object classes of the framework. FIG. 11 indicates that the class Product is from the class category Product Mechanism, meaning that the Product class belongs to the Product Mechanism category. FIG. 11 shows the Product class has a "contains" relationship with the class Object, which is from the class category Object Mechanism. In particular, the Product class represents the collection of built software objects that make up the finished software product, and includes many Object classes. Both the Product and Object classes are indicated with the "A" adornment to show they are abstract base classes, meaning that no specific instances of these classes will be created. These are superclasses from which subclasses can be derived. The modules that make up a software product are received by the framework as these objects. For example, if the software product is itself a FORTRAN compiler, then the Product class will comprise the built compiler. The compiler will include multiple Object classes comprising the various software modules that make up the compiler, such as library function routines, error message handlers, language dictionaries, and the like. Thus, the FORTRAN mathematical cosine function routine might comprise a class within the Object class and would include multiple Object class objects described further below.

FIG. 11 shows the Object class of the preferred embodiment having a "contains" relationship with four abstract base classes called ControlInfo, SourceInfo, ProcessInfo, and ProcessOutput, each of which belongs to the category Build_Source Mechanism. FIG. 11 also shows that each of these four classes inherits its specification from the abstract base class BldSrc, which also belongs to the category Build_Source Mechanism. Thus, each Object that comprises part of the software Product comprises an aggregate that includes component objects from the four classes ControlInfo, SourceInfo, ProcessInfo, and ProcessOutput. All of these classes are indicated by the "E" class adornment as being extensible, meaning that the framework user can customize and specify the structure of these classes. It should be noted that the framework user can specify a set of BldSrc classes different from the four shown in FIG. 11, as described further below.

FIG. 11 further shows that BldSrc contains two classes BldData and BldLevel, which are used to keep track of whether or not a built software object is up to date. These classes are described further below. Finally, FIG. 11 shows that BldSrc also has an inheritance relationship to the class BuildOptions, which is used to select options for the build process. The structure and attributes of the Product, Object, and BldSrc classes will next be described in greater detail in conjunction with FIGS. 12 through 14.

Figure 12:
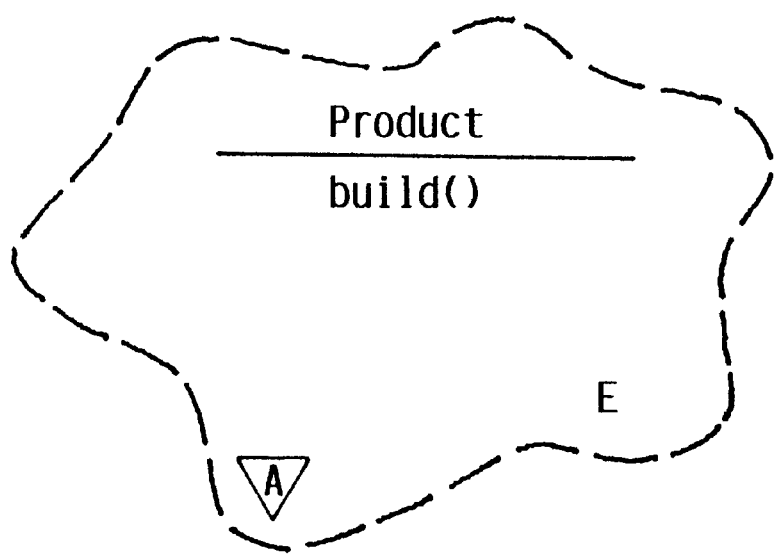
FIG. 12 is a class diagram of the Product class illustrated in FIG. 11.

FIG. 12 is a class diagram that illustrates more details of the Product class. FIG. 12 shows that Product includes an operation called build( ). The build( ) operation is the process used by the framework to initiate building the software product. The actual processing executed by the build( ) operation will be implementation dependent and therefore this class is indicated with an "E" as being extensible. Thus, the exact process invoked by the build( ) operation will be specified by the framework user.

Figure 13:
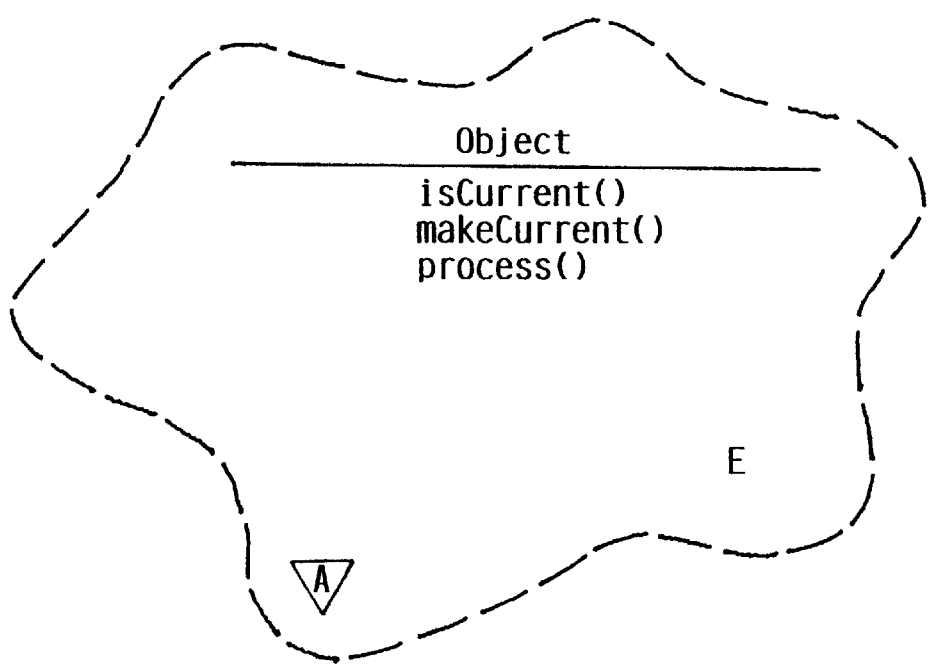
FIG. 13 is a class diagram of the Object class illustrated in FIG. 11.

FIG. 13 is a class diagram that illustrates the characteristics of the Object class. FIG. 13 shows that Object includes operations called isCurrent( ), makeCurrent( ), and process( ). The isCurrent( ) operation is an operation by which the system can examine a software build object and determine if the build level is current or not. The makeCurrent( ) operation is an operation by which the system initiates build processing for a build object that is determined to be not current. The makeCurrent( ) operation, for example, might initiate a compiler call to deliver a SourceInfo object to a language compiler. The isCurrent( ) and makeCurrent( ) operations are extensible operations specified by the framework user in accordance with the selected build level attribute. The process( ) operation is a core operation that causes the building process to take place. That is, the process( ) operation calls the isCurrent( ) operation to determine if software building is needed and calls the makeCurrent( ) operation to have the building accomplished.

Figure 14:
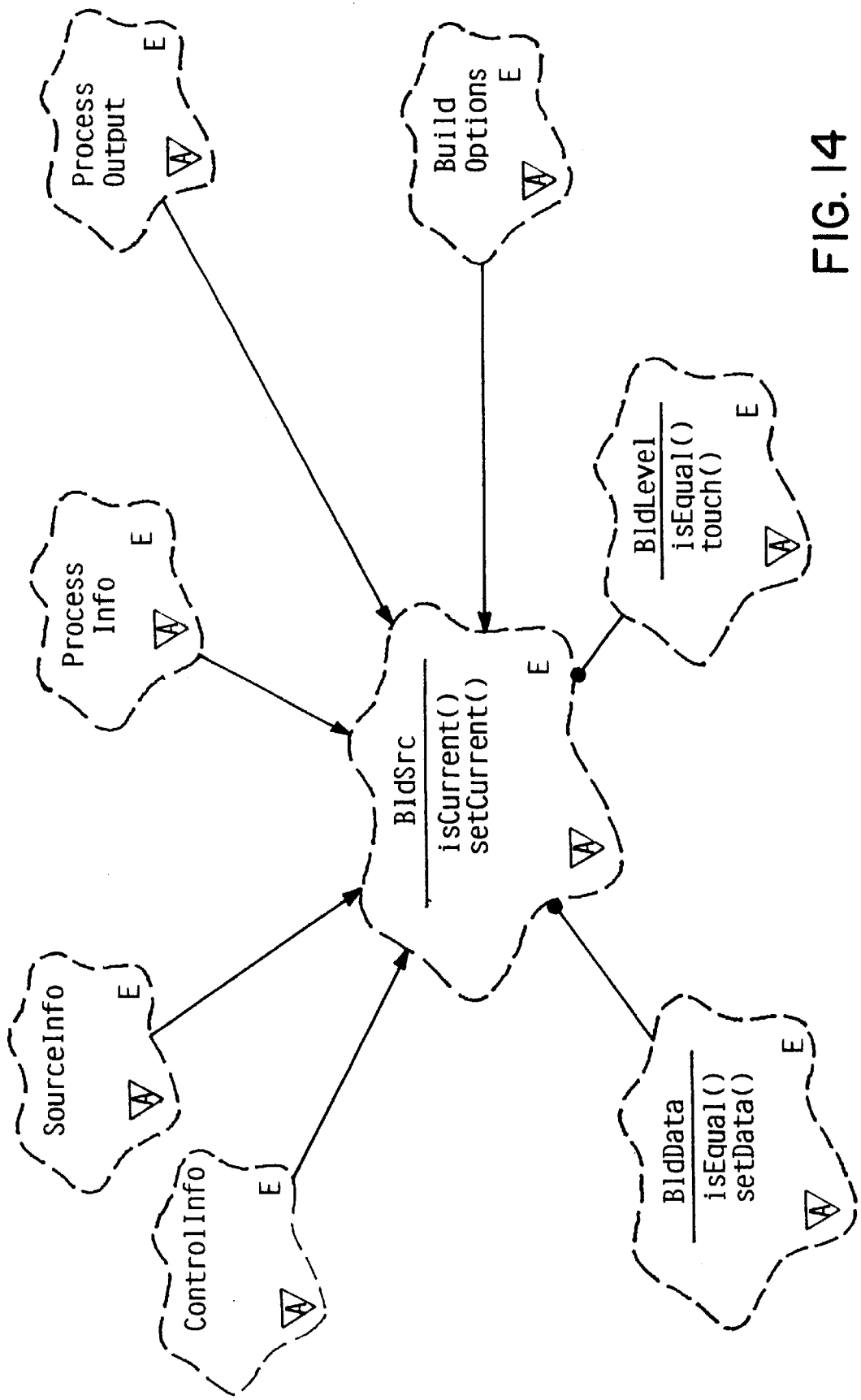
FIG. 14 is a class diagram of the BldSrc class illustrated in FIG. 11.

FIG. 14 is a class diagram that illustrates the characteristics of the BldSrc class. The four subclasses of ControlInfo, SourceInfo, ProcessInfo, and ProcessOutput are shown with their inheritance relationship to BldSrc, indicating that these four subclasses inherit their structure and behavior from their superclass of BldSrc, according to the rules of object oriented programming. As noted above, the BldSrc subclasses can be specified by the framework user so that as few as zero subclasses or as many as the computer system accommodates can be defined. In the preferred embodiment of FIG. 14, BldSrc is shown as an aggregate class having a "contains" relationship with the BldData class and the BldLevel class. FIG. 14 shows that the BldData class includes two operations, one called isEqual( ) and one called setData( ), and the BldLevel class includes an isEqual( ) operation and a touch( ) operation.

The four classes called ControlInfo, SourceInfo, ProcessInfo, and ProcessOutput comprise different aspects of the software build object and its processing. ControlInfo is the class that contains control information used to process the Object, such as parameters that specify where the finished software product is to be stored or installed. The parameters might comprise, for example, a pathname that specifies the system node location where the product is to be placed. Objects in the SourceInfo class contain the source code for the product being built. For example, if the product is a FORTRAN application, a SourceInfo object would likely contain FORTRAN language statements. SourceInfo also can contain information about the source that might be necessary to process the Object, such as a binding list of modules needed to assemble executable output. ProcessInfo contains build processing options, such as might be permitted by the compiler being used or the language in which the source code is written. ProcessOutput is the actual result of the build process and might comprise, for example, compiler output. As indicated by the relationships illustrated in FIG. 13, BldSrc is the base class from which these classes are derived. The BuildOptions class shown in FIG. 13 permits the framework user to override any of the options otherwise selected by the ProcessInfo class. Thus, the user at a particular system might choose to specify build options different from ProcessInfo options selected by the provider of SourceInfo.

As noted above, the BldLevel class is used to keep the two build level attributes related to each BldSrc object that indicate whether or not the object (and the data used to build the Product) is up to date. In the preferred embodiment, the attributes are referred to as LastChanged and UsedForBuild. The LastChanged attribute represents the build level when the BldSrc data was last modified. The Used ForBuild attribute represents the build level of the BldSrc object that was last used in building the Object of the Product. The framework supports whatever attribute is selected by the framework user to indicate the status of a build version. For example, software products might be given sequential version numbers as the product is updated, so that later-version products have higher numbers than earlier-version products. In that case, as between any two objects with different build levels, the more up-to-date version is the one with the higher build level. Alternatively, build level might be indicated by calendar date of the build product or the source code. As the computer system builds the software product requested by the framework user, the system determines whether a build source object is up to date, or current, by comparing the build level of the source object used to build the previous version software product with the build level of the source object presently being examined.

Thus, the BldLevel operation called isEqual( ) compares the two build level attributes, the build level of the BldSrc source object and the build level of the built software object. The isEqual( ) operation thereby determines if the built object being examined is up to date, generating a yes/no indication. A "yes" output indicates that the source object is current and that the corresponding Object need not be re-built. A "no" output means that the build levels are not equal and is interpreted to indicate that the Object should be re-built. If the Object is re-built, then the BldLevel operation called toucho is used to change the build level attribute of the built software build object. This operation is an extensible function so that the framework user specifies how the build level is changed to indicate it is current. In a system where the build level is the calendar date of the source code, for example, toucho would set the build level equal to the date of the BldSrc object. Alternatively, toucho might set the build level equal to the version number of the BldSrc object.

The BldData operation called isEqual( ) also compares a source object and a built object, except that it compares the source data itself, not simply the build level attribute. The BldData operation called setData( ) is the means by which the system loads a data block into a given data object. That is, if a BldSrc object has been updated so that the previous BldSrc object should be replaced with the new BldSrc object, then the setDatao operation accomplishes that result by making the replacement in the system memory.

Figure 15:
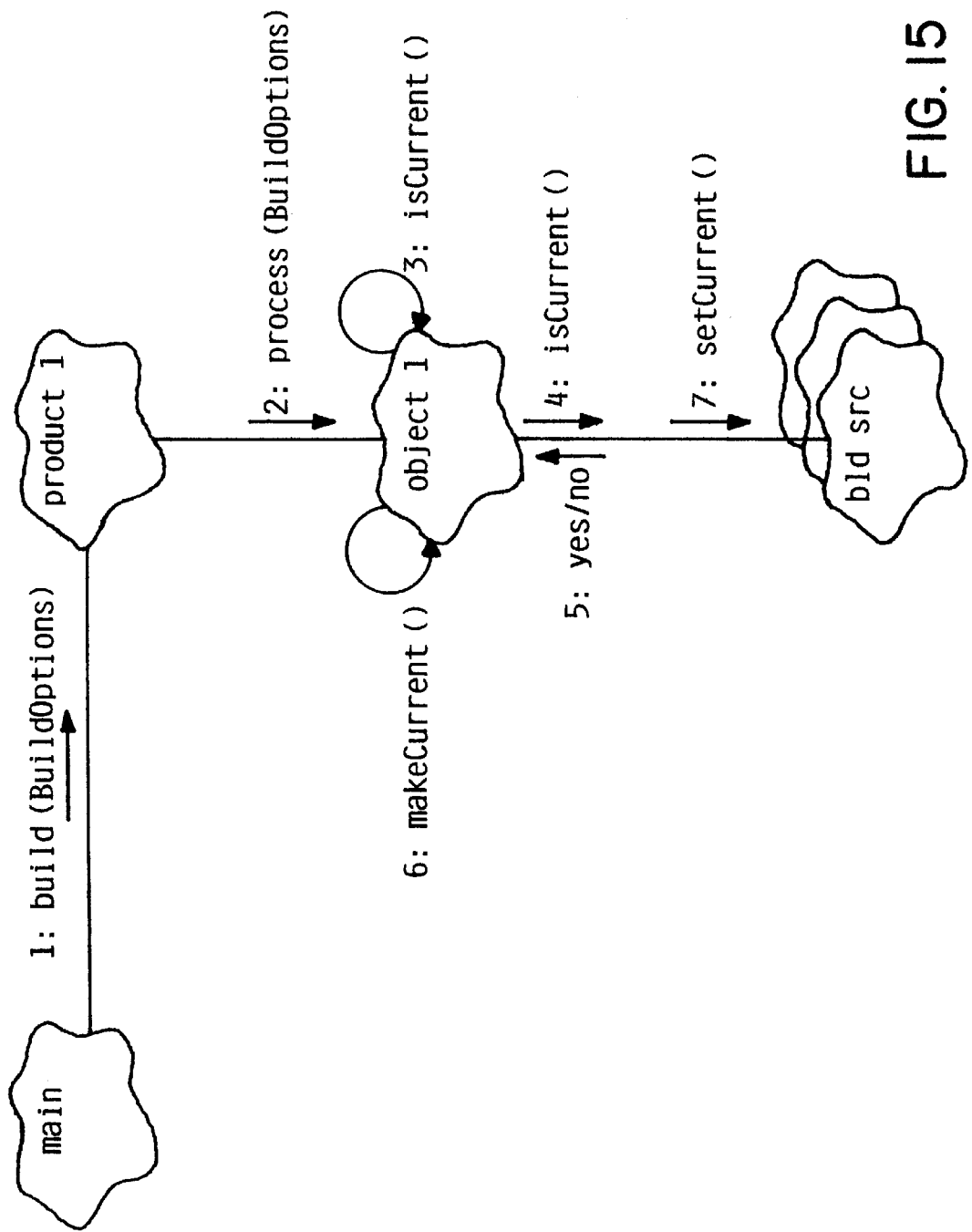
FIG. 15 is an object diagram representation of the processing steps executed by the host processor illustrated in FIG. 8 when building a software product.

The operating steps performed by the software build system constructed in accordance with the invention will be better understood with reference to object diagrams, which those skilled in the art will understand show processing for an object oriented programming framework implementation. FIG. 15 is an object-scenario diagram for the framework implemented in the computer system illustrated in FIG. 8. FIG. 15 is a scenario that shows how a user (represented as the "main" object cloud) initiates a software build with a request to build a software product, as indicated by the connecting line from the object cloud "main" to the object cloud "product 1" with the arrow labelled "1: build (BuildOptions)".

The exact format of such a request will be dependent on the computer system in which the framework is implemented, but can comprise an operating system command input from the operator/display interface, such as a keyboard entry. The operator input, for example, might comprise a build command with one or more parameters that specify a computer system file name or path specification to the build source objects needed for the build. In the preferred embodiment, the operator may specify any desired override of the ControlInfo class parameters with the BuildOptions class. Thus, the user creates the BldSrc objects and invokes the necessary methods to begin build processing. In response, the Product objects are created, or instantiated, by the system. The object creation is indicated by the object cloud labelled "product 1".

Next, the system invokes the process( ) operation of Object to build the Object objects and start the build processing for the instantiated source objects, as indicated by the legend "2: process(BuildOptions)" on the connecting line from the object cloud "product 1" to the object cloud "object 1". The object cloud "object 1" represents the Object comprising the software Product. The next step of processing is indicated by the legend "3: isCurrent( )" on the loop that returns back on the "object 1" object cloud. This loop represents the isCurrent( ) operation that serially checks the four objects in the Object class (ControlInfo, SourceInfo, ProcessInfo, and ProcessOutput) to see if they are current.

The next step is to check each BldSrc object to see if it is current. This processing is represented by the legend "4: isCurrent( )" on the connecting line from the "object 1" object cloud to the "bld src" object clouds. The "bld src" object clouds represent the set of BldSrc objects that comprise the source modules for the software build process. The number of BldSrc objects will depend on the particular application being built. The processing step represented by "5: yes/no" is the response to the isCurrent( ) operation from checking each BldSrc object. That is, "yes" means the BldSrc object is current and need not be re-built, whereas "no" means the BldSrc object is not current and must be re-built.

The next step is for the makeCurrent( ) operation to build the BldSrc object, if needed (that is, if a "no" response was obtained). This step comprises carrying out the proper processing, such as compilation or assembly, for each of the four Object objects (ControlInfo, SourceInfo, ProcessInfo, and ProcessOutput) that comprise a BldSrc object. This step is indicated by the legend "6: makeCurrent( )" on the loop leading back to the "object 1" object cloud. Finally, the last step is represented by "7: setCurrent( )" on the connecting line from the "object 1" object cloud to the "bld src" object clouds, which represents the processing of the setCurrent( ) operation that sets the build level attribute of each BldSrc object to "current" following the Object build. After the system automatically stores the build Product at the requested location, the application can be executed.

Figure 16:
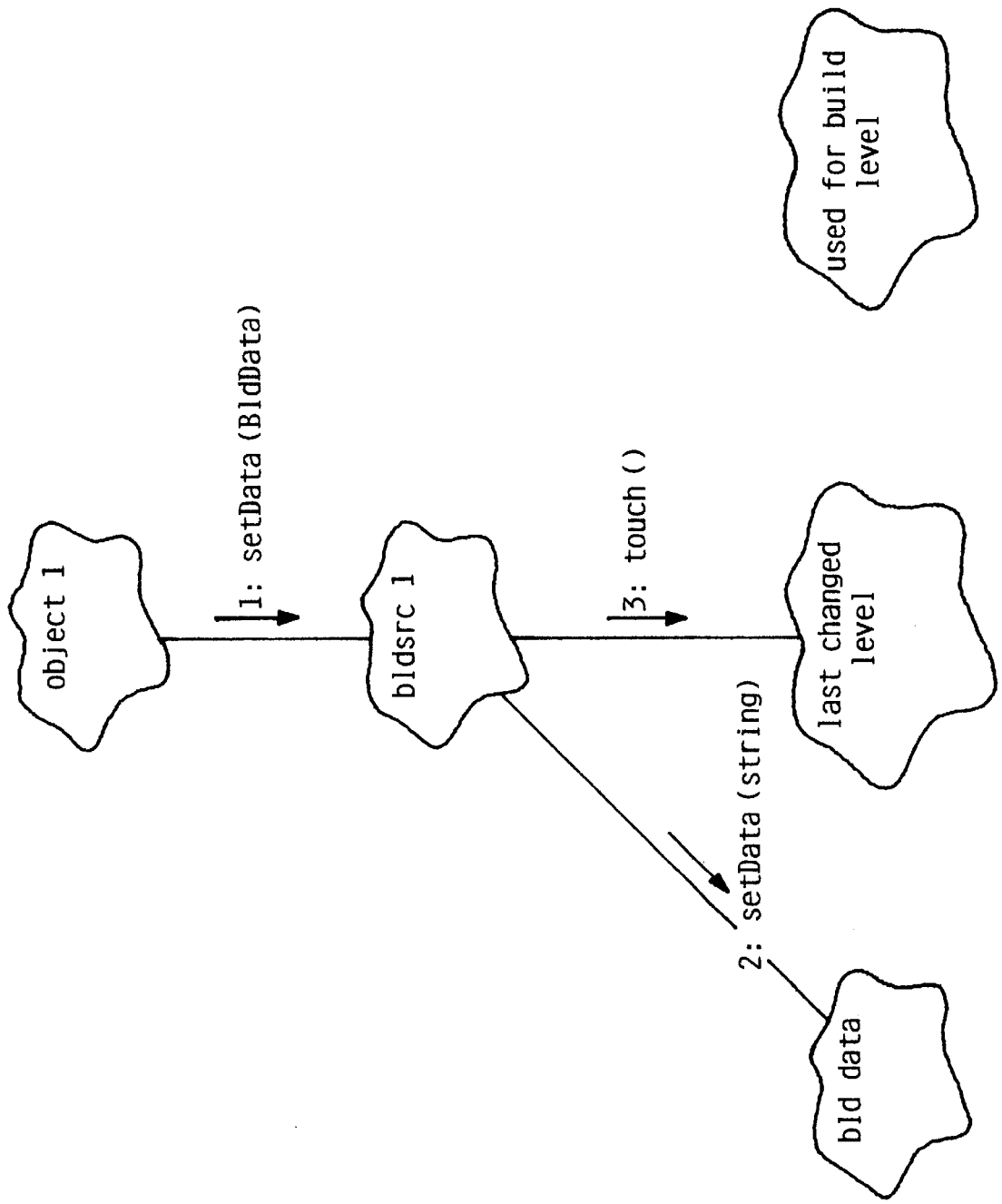
FIG. 16 is an object diagram representation of the processing steps executed by the host processor illustrated in FIG. 8 during an initial software build process.

FIG. 16 is an object-scenario diagram that illustrates initial processing carried out the first time a software product is built. As noted above, the software build processing of the framework automatically compares the build level of the current source objects with the build level of the objects used in the previous build. The first time a source object is processed, there will be no previous build. Therefore, initial processing must set the "previous build" attributes to a sufficiently low build level that the rebuild process will be automatically triggered. The ControlInfo objects necessary to accomplish such initial processing might be included by a BldSrc provider or might be specified by the user through the BuildOptions class. For example, the build level attributes of the UsedForBuild attribute of the BldLevel objects might be set to zero so that the build level attributes of the LastChanged attribute will undoubtedly show that a re-build is needed.

The first step of initial build processing, after the start of the build process is requested by the user, is to load the source code into the created BldSrc objects using the setData( ) operation. This step is represented by the legend "1: setData(BldData)" on the connecting line from the "object 1" object cloud to the "bld src 1" object cloud. The parameter to the operation is shown as "BldData" to indicate that, initially, it is the four Object objects of BldData that must be loaded, including the identification of the software product to be built. Next, the source data specified by the four BldSrc objects is loaded into the BldData objects. This processing is represented by the legend "2: setData(string)" on the connecting line from the "bld src 1" object cloud to the "bld data" object cloud, indicating that the setData( ) operation is called on the BldData object. Next, the touch( ) operation is used to set the LastChanged build level attribute of the BldLevel class for the Object objects to the current level of the source code, which should ensure that comparison by the isCurrent( ) operation will result in a re-build.

Figure 17:
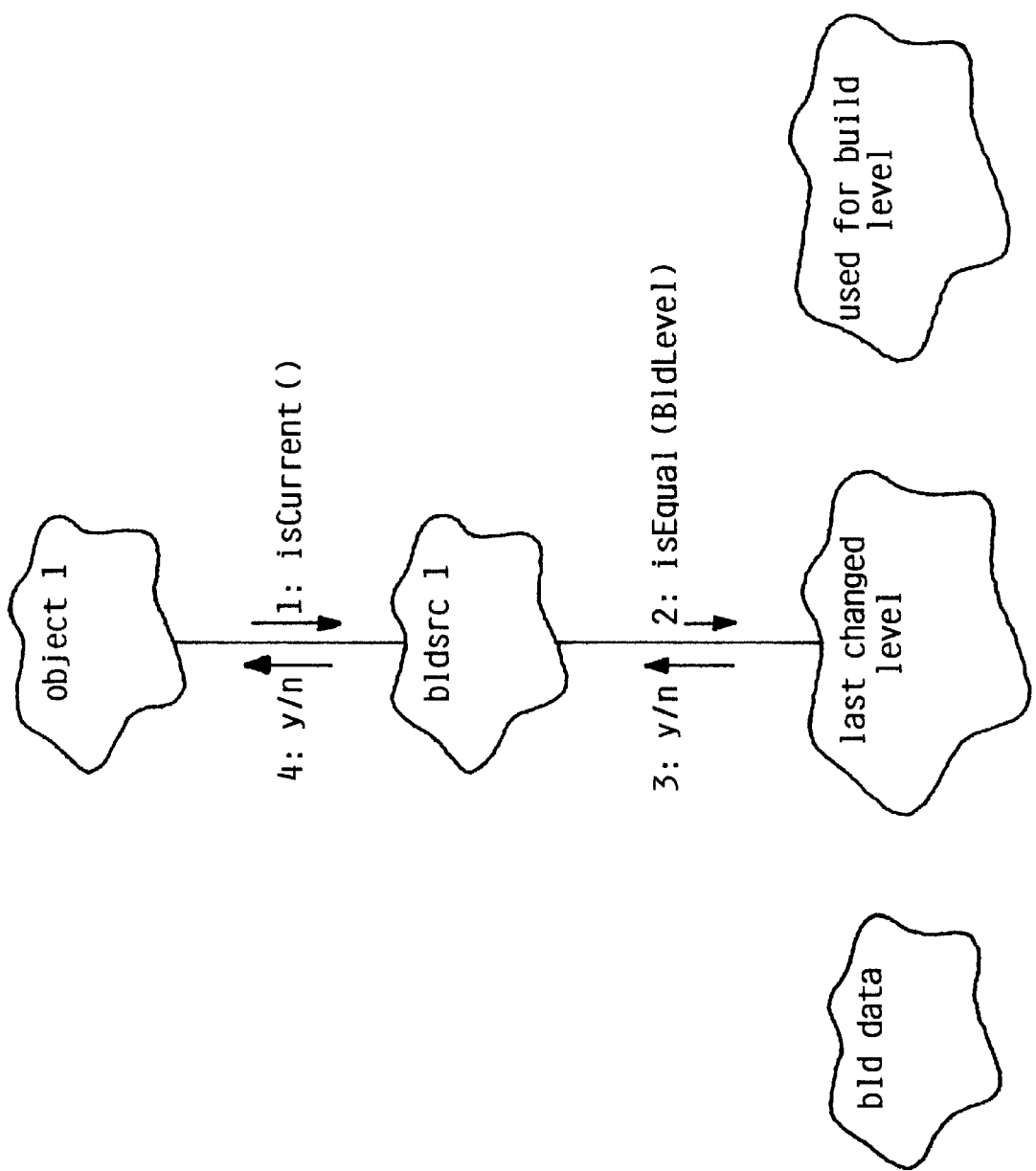
FIG. 17 is an object diagram representation of the processing steps executed by the host processor illustrated in FIG. 8 in performing the isCurrent( ) operation.

FIG. 17 is an object-scenario diagram that illustrates processing carried out for the isCurrent( ) operation. As indicated, the isCurrent( ) processing begins with the operation being called by an Object object on a BldSrc object. This processing is represented by the legend "1: isCurrent( )" on the connecting line from the "object 1" object cloud to the "bld src 1" object cloud. The next processing step is for the isEqual( ) operation to be called on the BldLevel object, as indicated by "2: isEqual(BldLevel)" on the connecting line from the "bld src 1" object cloud to the "last changed level" object cloud. If the LastChanged level attribute of the BldData object is the same as the build level of the current BldData object, then the operation returns a "yes" output. The operation otherwise returns a "no" output. The yes/no return output is indicated by the "3: y/n" legend on the connecting line back to the "bld src 1" object cloud. Finally, the yes/no output is returned to the invoking Object object, as indicated by the "4: y/n" legend on the connecting line from the "bld src 1" object cloud to the "object 1" object cloud.

Figure 18:
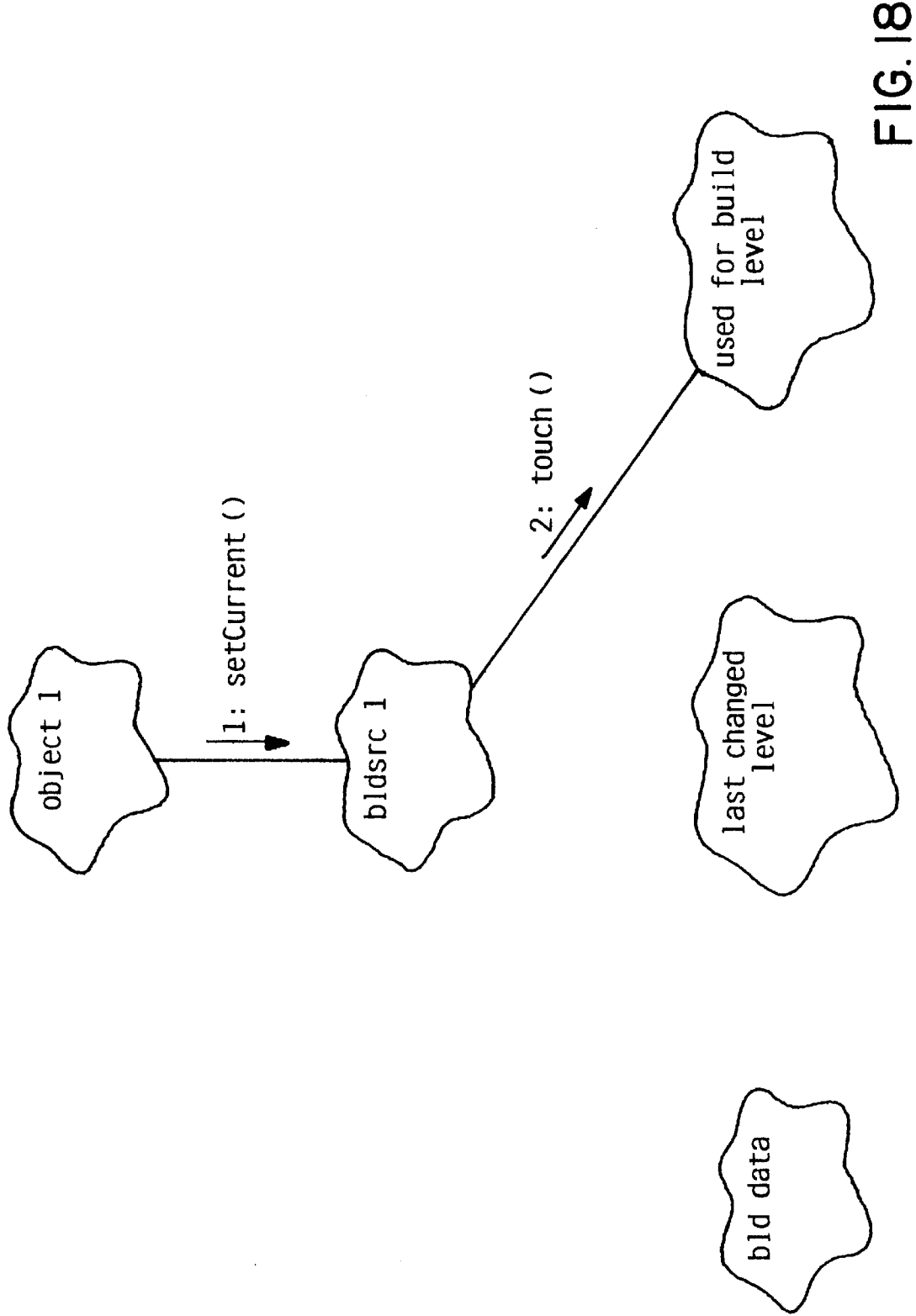
FIG. 18 is an object diagram representation of the processing steps executed by the host processor illustrated in FIG. 8 in performing the makeCurrent( ) operation.

FIG. 18 is an object-scenario diagram that illustrates processing carried out for the setCurrent( ) operation. If the isCurrent( ) operation output indicates that a software build is necessary, then the makeCurrent( ) operation is invoked to accomplish the software build and then the setCurrent( ) operation is invoked to update the build level of the BldSrc objects. The setCurrent( ) step is necessary so the rebuild will not be needlessly repeated at the next build processing.

The first step of isCurrent( ) processing begins with invoking the isCurrent( ) operation on the BldSrc objects. This processing is represented by the legend "1: setCurrent( )" on the connecting line from the "object 1" object cloud to the "bld src 1" object cloud. Next, the touch( ) operation is called on the UsedForBuild level attribute of the BldLevel object, which results in the attribute being set equal to the build level of the current BldSrc object. In this way, the build level of the Object will be set current so that it will not be needlessly re-built at the next build process.

The embodiments and examples set forth herein were presented in order to best explain the present invention and its practical application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed. Many modifications and variations are possible in light of the above teaching without departing from the spirit and scope of the following claims.

Notation

There is, as yet, no uniformly accepted notation for communicating object-oriented programming ideas. The notation used in this specification is very similar to that known in the programming industry as Booch notation, after Grady Booch. Mr. Booch is the author of *Object-Oriented Analysis and Design With Applications,* 2d ed. (1994), available from The Benjamin/Cummings Publishing Company, Inc., Redwood City, Calif., USA. Use of Booch notation concepts within this specification should not be taken to imply any connection between the inventors and/or the assignee of this patent application and Mr. Booch or Mr. Booch's employer. The notational system used by Mr. Booch is more fully explained at Chapter 5, pp. 171–228 of the aforementioned book. The notational system used herein will be explained generally below. Other notational conventions used herein will be explained as needed.

A system that is modeled by an object-oriented framework can be represented at a high level of abstraction by a diagram called a top-level class diagram. FIG. 1 of the drawings is an example of a top-level class diagram containing boxes that represent abstractions of the modeled system. The boxes are arranged in a hierarchy such that boxes representing abstractions close to the physical components of the system are at the lower levels of the diagram and boxes representing more abstract, functional components are closer to the top of the diagram. In FIG. 1, the boxes are labelled as "mechanisms" to denote that the abstractions comprise means for implementing modeled system components. The boxes (mechanisms) can be thought of as categories comprising groups of similar classes defined according to object-oriented programming concepts. FIG. 1 represents a zoo administration model and therefore the lower hierarchy boxes include a box called Animal Mechanism, which represents animals within the zoo model, and a box called Containment Unit Mechanism, which represents animal pens and cages. At the highest level of FIG. 1, the box called Zoo Administration represents a functional abstraction that encompasses a variety of administrative tasks that are performed by personnel.

The boxes in a top-level class diagram represent the system abstractions that provide the system behavior. The system abstractions include classes and objects. Details of the system classes are provided in a class diagram that is used to show the class categories and to indicate the relationships and responsibilities of the classes. A class is represented by an irregularly shaped, dashed-line icon commonly referred to a cloud. FIG. 2, for example, shows several classes represented as clouds. Each class is identified by a name that is unique to the associated class category and also indicates the relationship of each class to one of the mechanisms illustrated in FIG. 1. Within a class icon, the class name is listed above attribute names, operation names followed by parentheses, and constraints that are enclosed within brackets. FIG. 3 illustrates the class Zoo Administrator in greater detail. FIG. 3 indicates that the Zoo Administrator class includes multiple operations, including ones called "5_minute_timer( )", "add_animal( )", and "add_containment_unit( )". Words in the operation names (and class attribute names) are sometimes separated by an underscore for easier reading. An example of a class attribute listing is shown by the attributes called "feed_freq" and "temp_range" in the class Animals illustrated in FIG. 5.

Connecting lines between mechanisms (FIG. 1) and classes (FIG. 2) indicate the nature of the relationships between such respective abstractions. Thus, connections between the boxes in FIG. 1 represent relationships between the various mechanisms. A straight connecting line, for example, represents a simple association relationship indicating shared information. A "using" relationship is a refinement of a simple association whereby one abstraction that is referred to as a server or supplier provides services to another abstraction that is referred to as a client. Such a relationship is indicated by an open circle at one end of a simple association line, the open circle end designating the client that "uses" the associated server.

Another refinement of a simple association between two classes is a type referred to as an inheritance relationship. Inheritance is a relationship among classes in which one class shares the structure and/or behavior associated with one or more other classes. An inheritance association is also referred to as a "is a" relationship. Thus, given two classes A and B, the class A has an inheritance relationship with the class B if A is an example of a B; A is said to be a subclass of B and B is said to be a superclass or parent of A. That is, A "is a" B. An inheritance relationship is denoted with a connecting line that includes an arrowhead at one end to indicate a subclass that derives its characteristics from a parent class at the other end of the line.

Another refinement of class relationships is called an aggregation relationship, which denotes an association between a whole and its parts or attribute classes. In notation, an aggregation relationship is indicated between a whole class and an attribute class connected with an association line by a solid circle at the whole class end, with an attribute class at the other end.

Another relationship specified by a class diagram is an instantiation relationship. An instantiation relationship represents an instance of a class such as a particular implementation of a class as supported by a programming language. For example, a class called "animal" can have multiple instantiations comprising lions, tigers, and bears. An instantiation of a class is represented by a dashed association line with an arrowhead pointing from an instance of a class to the general class.

Finally, a class relationship referred to as a metaclass denotes a relationship in which a class itself is treated as an object that can be manipulated. That is, a metaclass is a class whose instances are themselves classes. Some computer languages, such as Small Talk, support the concept of a metaclass. Such relationships are denoted by a shaded line with an arrowhead pointing from an instance of a metaclass to the general metaclass.

Classes can be parameterized, which denotes a family of classes whose structure and behavior are defined independently of its formal class parameters. A parameterized class is represented by a cloud-shaped class icon with a rectangular box placed over a portion of the cloud. The parameter list is named within the rectangular box. An instantiated class includes a parameter box, called an adornment, in contrast to a dashed line box for a general class. The instantiation relationship between a parameterized class and its instantiated class is represented as a dashed line pointing to the parameterized class. Typically, an instantiated class requires a "using" relationship to another concrete class for use as an actual parameter.

Properties of classes can be represented by class adornments that are enclosed within the class cloud icon. In particular, an abstract class is denoted by an upper case block "A" within a triangle that is placed within a cloud. An abstract class is a class for which no instances may be created. That is, it is a class of classes. Other class adornments are functions of the OO implementation language. For example, the C++ language permits special class qualifications that will be given special adornments. A static class is represented by an upper case block "S" within an adornment triangle, a friend class is denoted by an upper case block "F" within an adornment triangle, and a virtual class is represented by an upper case block "V" within an adornment triangle.

In addition to defining classes, a designer of an object oriented programming system must define objects (see page 136 of Booch). Objects are represented as solid line clouds within which is placed the object name located above a list of object attributes. An object is a tangible entity that exhibits a well defined behavior. An object is intended to represent some part of a real system that is being represented by the object oriented program. An object is characterized by a state, a behavior, and an identity. An object can be thought of as an instance of a class. The behavior of an object is an indication of how the object acts and reacts in terms of its state changes and its message-passing actions.

Objects and their interrelationships are represented in object diagrams that comprise object icons having links that indicate synchronization between objects. Links are sequentially numbered to indicate the flow of operations. The existence of a link between two objects indicates an association between their corresponding classes and denotes a path of communication between them. Thus, a link between two objects indicates that one object may send messages to another. The direction of message transfer is indicated by adorning a simple connecting line with an arrowhead that points from an object that invokes an operation, referred to as the client, to the object that provides the operation, referred to as the supplier. Such a representation of a simple synchronization relationship denotes the simplest form of message-passing. Such an association can indicate, for example, the invocation of an operation. Operation parameters can be indicated adjacent the linking line.

Some objects may be active, meaning that they embody their own thread of control. That is, such objects are not simply sequential. Active objects may have a variety of concurrency characteristics. If an object has multiple threads of control, then synchronization must be specified. Message synchronization can be synchronous, meaning that the client will wait until the supplier accepts the message. Synchronous synchronization is indicated with an "X" with an arrowhead. Synchronization can encompass balking message-passing, meaning that the client will abandon the message if the supplier cannot immediately service the message. Balking is indicated with an arrowhead turned back on itself. Synchronization can encompass a time-out synchronization, meaning that the client will abandon the message if the supplier cannot service the message within a specified amount of time. Time-out synchronization is indicated with a clock face representation adjacent a linking arrowhead. Finally, synchronization can encompass an asynchronous message, meaning that the client sends an event to a supplier for processing, the supplier queues the message, and the client then proceeds without waiting for the supplier. Those skilled in the art will appreciate that asynchronous message synchronization is analogous to interrupt handling. Asynchronous message synchronization is indicated with a half arrowhead.

It bears mention that the Booch notation includes interaction diagrams that trace the execution of objects and classes. Interaction diagrams are essentially restructured object diagrams. That is, interaction diagrams do not convey any additional information from that conveyed by object diagrams, but simply present the same information in a different format. The present specification makes use of object diagrams rather than interaction diagrams, but those skilled in the art will recognize that they are equivalent and also will understand how to convert from one to the other without further explanation.

In FIG. 7, for example, the object called Zelda 706 obtains a list of current zoo keepers by calling an operation called List Zoo Keepers from the object called Zoo Keeper Register. The second processing step is represented in FIG. 7 by the Zoo Keeper Register object responding to the operation call by passing a message to the Zelda object that comprises the zoo keeper list. The zoo keeper objects include members of the Zoo Keepers class called Tina, Vince, and Fred. The third step indicated in the object diagram is for the object Zelda to pass a message to each of the zoo keepers instructing them to check the animals by calling the respective Check Animals operation of each zoo keeper object.

We claim:

1. A computer system comprising:
    a central processing unit;
    a user interface; and
    a main memory having an operating system that supports an object oriented programming environment containing a framework having a Product class object that represents a software product to be built and that contains an Object class of objects that represent modules of the software product, wherein the Object class contains a BldSrc class of objects that represent source code modules to be subjected to build processing, thereby generating executable built code, and wherein the BldSrc class includes operations that determine if any object of the BldSrc class is not a current source code module, such that a respective object of the BldSrc class that is not current is subjected to the build processing, thereby making the object current, and otherwise is not subjected to the build processing.

2. A computer system as defined in claim 1, wherein the BldSrc class includes UsedForBuild objects that indicate a build level attribute of each source code module object used in building a first Product object and includes LastChanged objects that indicate a build level attribute of corresponding source code module objects in a second Product object, such that the source code module objects in the second Product object are current if the build level attributes of UsedForBuild and LastChanged are equal.

3. A computer system as defined in claim 2, wherein one of the BldSrc methods comprises an isEqual( ) operation that compares the build level attributes of two corresponding BldSrc objects and determines if the respective build level attributes are equal.

4. A computer system as defined in claim 1, wherein at least one of the objects of the Object class specifies a parameter that indicates the main memory location where the built code shall be placed.

5. A computer system as defined in claim 1, wherein the objects of the Object class include objects belonging to a ControlInfo class containing control objects, a SourceInfo class containing source code objects, a ProcessInfo class containing build process control parameter objects, and a ProcessOutput class containing build code objects.

6. A computer system as defined in claim 1, wherein the BldSrc class is a superclass for BuildOptions objects that specify at least one predetermined parameter of the build processing, which is received by at least one of the control Object class objects and thereby overrides the predetermined parameter otherwise specified by the Object class.

7. An object oriented framework for use in a computer system having an operating system that supports an object oriented programming environment in which source code modules are subjected to build processing, thereby generating executable built modules, and having a memory in which the object oriented framework can be stored, the framework comprising:
    a Product object that represents a software product to be built;
    an Object class containing objects that represent modules of the software product;
    a BldSrc class of objects contained by the Object class, wherein the BldSrc objects represent source code modules to be subjected to build processing, thereby generating executable built code, and wherein the BldSrc class includes operations that determine if any object of the BldSrc class is not a current source code module, such that a respective object of the BldSrc class that is not current is subjected to the build processing, thereby making the object current, and otherwise is not subjected to the build processing; and
    a user interface that receives user commands to initiate the build processing.

8. An object oriented framework as defined in claim 7, wherein the BldSrc class further includes UsedForBuild objects that indicate a build level attribute of each source code module object used in building a first Product object and includes LastChanged objects that indicate a build level attribute of corresponding source code module objects in a second Product object, such that the source code module objects in the second Product object are current if the build level attributes of UsedForBuild and LastChanged are equal.

9. An object oriented framework as defined in claim 8, wherein one of the BldSrc methods comprises an isEqual( ) operation that compares the build level attributes of two corresponding BldSrc objects and determines if the respective build level attributes are equal.

10. An object oriented framework as defined in claim 7, wherein one of the objects of the Object class specifies a parameter that indicates a main memory location of the computer system where the built code shall be placed.

11. An object oriented framework as defined in claim 7, wherein the objects of the Object class include objects belonging to a ControlInfo class containing Objects, a SourceInfo class containing source code objects, a ProcessInfo class containing build process control parameter objects, and a ProcessOutput class containing built code objects.

12. An object oriented framework as defined in claim 7, wherein the BldSrc class is a superclass for BuildOptions objects that specify at least one of the predetermined parameters of the build processing, which are contained by at least one of the Object class objects and thereby override the predetermined parameter otherwise specified by the Object class.

13. A program product data storage device, tangibly embodying a program of machine-readable instructions executable by a computer system having an operating system that supports an object-oriented programming environment, the program product comprising:
- a signal bearing media; and
- a framework recorded on the signal bearing media, that provides a Product object that represents a software product to be built;
- an Object class containing objects that represent modules of the software product;
- a BldSrc class of objects contained by the Object class, wherein the BldSrc objects represent source code modules to be subjected to build processing, thereby generating executable, built code, and wherein the BldSrc class includes operations that determine if any object of the BldSrc class is not a current source code module, such that a respective object of the BldSrc class that is not current is subjected to the build processing, thereby making the object current, and otherwise is not subjected to the build processing; and
- a user interface that receives user commands to initiate the build processing.

14. A program product as defined in claim 13, wherein the BldSrc class of the framework includes UsedForBuild objects that indicate a build level attribute of each source code module object used in building a first Product object and includes LastChanged objects that indicate a build level attribute of corresponding source code module objects in a second Product object, such that the source code module objects in the second Product object are current if the build level attributes of UsedForBuild and LastChanged are equal.

15. A program product as defined in claim 14, wherein one of the BldSrc methods of the framework comprises an isEqual( ) operation that compares the build level attributes of two corresponding BldSrc objects and determines if the respective build level attributes are equal.

16. A program product as defined in claim 13, wherein at least one of the framework objects of the Object class specifies a parameter that indicates a main memory location of the computer system where the built code shall be placed.

17. A program product as defined in claim 13, wherein the framework objects of the Object class include objects belonging to a ControlInfo class containing Objects, a SourceInfo class containing source code objects, a ProcessInfo class containing build process control parameter objects, and a ProcessOutput class containing build code objects.

18. A program product as defined in claim 13, wherein the framework BldSrc class is a superclass for BuildOptions objects that specify at least one predetermined parameter of the build processing, which is received by at least one of the Object class objects and thereby overrides the predetermined parameter otherwise specified by the Object class.

19. A method of distributing a program product from a first computer system to a second computer system, the method comprising the steps of:
- establishing a connection between the first computer system and the second computer system; and
- transmitting the program product from the first computer system to the second computer system, wherein the program product comprises an object oriented framework having
  - a Product object that represents a software product to be built;
  - an Object class containing objects that represent modules of the software product;
  - a BldSrc class of objects contained by the Object class, wherein the BldSrc objects represent source code modules to be subjected to build processing, thereby generating executable built code, and wherein the BldSrc class includes operations that determine if any object of the BldSrc class is not a current source code module, such that a respective object of the BldSrc class that is not current is subjected to the build processing, thereby making the object current, and otherwise is not subjected to the build processing; and
  - a user interface that receives user commands to initiate the build processing.

20. A method of distributing a program product as defined in claim 19, wherein the BldSrc class of the program product framework includes UsedForBuild objects that indicate a build level attribute of each source code module object used in building a first Product object and includes LastChanged objects that indicate a build level attribute of corresponding source code module objects in a second Product object, such that the source code module objects in the second Product object are current if the build level attributes of UsedForBuild and LastChanged are equal.

21. A method of distributing a program product as defined in claim 20, wherein one of the BldSrc methods of the program product framework comprises an isEqual( ) operation that compares the build level attributes of two corresponding BldSrc objects and determines if the respective build level attributes are equal.

22. A method of distributing a program product as defined in claim 19, wherein at least one of the program product framework objects of the Object class specifies a parameter that indicates a main memory location of the computer system where the built code shall be placed.

23. A method of distributing a program product as defined in claim 19, wherein the objects of the program product framework Object class include objects belonging to a ControlInfo class containing Objects, a SourceInfo class containing source code objects, a ProcessInfo class containing build process control parameter objects, and a ProcessOutput class containing build code objects.

24. A method of distributing a program product as defined in claim 19, wherein the BldSrc class is a superclass for BuildOptions objects that specify at least one predetermined parameter of the build processing, which is received by at least one of the Object class objects and thereby overrides the predetermined parameter otherwise specified by the Object class.

25. A method of executing a software build process in a computer system having a central processing unit that controls processing in the computer system, a user interface, and a main memory having an operating system that supports an object oriented programming environment, the method comprising the steps of:
- providing an object oriented framework having a Product class object that represents a software product to be built and that contains an Object class of objects that represent modules of the software product, wherein the Object class contains a BldSrc class of objects that represent source code modules to be subjected to build processing, thereby generating executable, built code, and wherein the BldSrc class includes operations that determine if any object of the BldSrc class is not a current source code module, such that a respective object of the BldSrc class that is not current is subjected to the build processing, thereby making the object current, and otherwise is not subjected to the build processing;

receiving the BldSrc class objects comprising the source code modules;

receiving a user request to initiate a software build process;

subjecting the BldSrc objects to build processing and thereby generating executable built code; and placing the built code in the Product object.

26. A method as defined in claim 25, wherein the received BldSrc class includes UsedForBuild objects that indicate a build level attribute of each source code module object used in building a first Product object and includes LastChanged objects that indicate a build level attribute of corresponding source code module objects in a second Product object, such that the source code module objects in the second Product object are current if the build level attributes of UsedForBuild and LastChanged are equal.

27. A method as defined in claim 26, wherein one of the received BldSrc operations comprises an isEqual( ) operation that compares the build level attributes of two corresponding BldSrc objects and determines if the respective build level attributes are equal.

28. A method as defined in claim 25, wherein at least one of the objects of the received Object class specifies a parameter that indicates the main memory location where the built code shall be placed.

29. A method as defined in claim 25, wherein the objects of the received Object class include objects belonging to a ControlInfo class containing Objects, a SourceInfo class containing source code objects, a ProcessInfo class containing build process control parameter objects, and a ProcessOutput class containing build code objects.

30. A method as defined in claim 25, wherein the received BldSrc class is a superclass for BuildOptions objects that specify at least one predetermined parameter of the build processing, which is received by at least one of the Object class objects and thereby overrides the predetermined parameter otherwise specified by the Object class.

* * * * *